United States Patent [19]
Sanders

[11] Patent Number: 6,041,050
[45] Date of Patent: *Mar. 21, 2000

[54] CELL SELECTOR METHOD AND APPARATUS FOR USE IN TIME DIVISION MULTIPLEXERS AND SWITCHES

[75] Inventor: Ray W. Sanders, Los Angles, Calif.

[73] Assignee: Circuit Path Network Systems Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/783,217

[22] Filed: Jan. 9, 1997

Related U.S. Application Data

[63] Continuation of application No. 08/606,391, Feb. 23, 1996, abandoned, which is a continuation of application No. 08/538,839, Oct. 4, 1995, Pat. No. 5,502,723, which is a continuation of application No. 08/239,204, May 6, 1994, abandoned.

[51] Int. Cl.[7] .................................................. H04J 3/24
[52] U.S. Cl. ......................... 370/352; 370/370; 370/399; 370/431
[58] Field of Search ................................ 370/389, 395, 370/399, 432, 386, 369, 370, 375, 376, 377, 380, 468, 465, 352, 431, 535, 537, 538–541, 543

[56] References Cited

U.S. PATENT DOCUMENTS

| | | | |
|---|---|---|---|
| 3,982,074 | 9/1976 | Clark et al. ................................ | 370/84 |
| 3,982,077 | 9/1976 | Clark et al. ................................ | 370/84 |
| 4,982,273 | 1/1991 | Protopapas ............................... | 370/85.7 |
| 5,062,105 | 10/1991 | McKnight et al. . | |
| 5,127,002 | 6/1992 | Shaik et al. ............................. | 370/95.1 |
| 5,239,544 | 8/1993 | Balzano et al. .......................... | 370/94.2 |
| 5,502,723 | 3/1996 | Sanders ................................... | 370/60.1 |

*Primary Examiner*—Ajit Patel
*Attorney, Agent, or Firm*—Robert C. Strawbrich

[57] ABSTRACT

The method of the present invention achieves a desired assignment of the physical cell slots comprising a time division multiplexed frame to embedded channels by ascribing an element address to uniquely identify each of the cell slots of the frame. A logical assignment of the cell slots of the frame is made to the embedded channels to be established between one or more specific data sources and sinks. A transform chosen to produce a particular distribution of assignments is then applied to the set of element addresses to produce a set of cell slot addresses, each of which uniquely identifies each cell slot of the frame by its relative physical position within the frame. Each of the element addresses (used to logically associate a cell slot with a channel to be established) is uniquely linked on a one-to-one basis with one of the set of cell slot addresses (used to identify relative position of a cell slot within the frame) through the predetermined transform. This linking of element addresses to cell slot addresses results in a mapping of the channels to cell slots based on their ordered physical position within the frame. The mapping characteristics are directly a function of the nature of the transform, which can be any predetermined transform designed to achieve desired mapping characteristics. The cell slot addresses are then mapped to position numbers as a function of their relative numerical values, thus completing the mapping of cell slots to channels by their ordinal positions within the frame.

9 Claims, 22 Drawing Sheets

Explicit Addressing

Implicit Addressing time →

Time-Space-Time Switch Arrangement

Fig. 5a

| Element | Address | Cell Slot Address | Cell Slot Address | Element Address | Ordinal Position Number |
|---|---|---|---|---|---|
| 00000 | E0  | T0  | T0  | E0  | 1 |
| 00001 | E1  | T16 | T1  | E16 | 2 |
| 00010 | E2  | T8  | T2  | E8  | 3 |
| 00011 | E3  | T24 | T3  | E24 | 4 |
| 00100 | E4  | T4  | T4  | E4  | 5 |
| 00101 | E5  | T20 | T5  | E20 | 6 |
| 00110 | E6  | T12 | T6  | E12 | 7 |
| 00111 | E7  | T28 | T7  | E28 | 8 |
| 01000 | E8  | T2  | T8  | E2  | 9 |
| 01001 | E9  | T18 | T9  | E18 | 10 |
| 01010 | E10 | T10 | T10 | E10 | 11 |
| 01011 | E11 | T26 | T11 | E26 | 12 |
| 01100 | E12 | T6  | T12 | E6  | 13 |
| 01101 | E13 | T22 | T13 | E22 | 14 |
| 01110 | E14 | T14 | T14 | E14 | 15 |
| 01111 | E15 | T30 | T15 | E30 | 16 |
| 10000 | E16 | T1  | T16 | E1  | 17 |
| 10001 | E17 | T17 | T17 | E17 | 18 |
| 10010 | E18 | T9  | T18 | E9  | 19 |
| 10011 | E19 | T25 | T19 | E25 | 20 |
| 10100 | E20 | T5  | T20 | E5  | 21 |
| 10101 | E21 | T21 | T21 | E21 | 22 |
| 10110 | E22 | T13 | T22 | E13 | 23 |
| 10111 | E23 | T29 | T23 | E29 | 24 |
| 11000 | E24 | T3  | T24 | E3  | 25 |
| 11001 | E25 | T19 | T25 | E19 | 26 |
| 11010 | E26 | T11 | T26 | E11 | 27 |
| 11011 | E27 | T27 | T27 | E27 | 28 |
| 11100 | E28 | T7  | T28 | E7  | 29 |
| 11101 | E29 | T23 | T29 | E23 | 30 |
| 11110 | E30 | T15 | T30 | E15 | 31 |
| 11111 | E31 | T31 | T31 | E31 | 32 |

Fig. 5b

| Element | Address | Cell Slot Address | Cell Slot Address | Element Address | Ordinal Position Number |
|---|---|---|---|---|---|
| 00000 | E0  | T0  | T0  | E0  | 1 |
| 00001 | E1  | T16 | T1  | E16 | 2 |
| 00010 | E2  | T8  | T2  | E8  | 3 |
| 00011 | E3  | *T24* | *T3*  | *E24* |   |
| 00100 | E4  | T4  | T4  | E4  | 4 |
| 00101 | E5  | T20 | T5  | E20 | 5 |
| 00110 | E6  | T12 | T6  | E12 | 6 |
| 00111 | E7  | *T28* | *T7*  | *E28* |   |
| 01000 | E8  | T2  | T8  | E2  | 7 |
| 01001 | E9  | T18 | T9  | E18 | 8 |
| 01010 | E10 | T10 | T10 | E10 | 9 |
| 01011 | E11 | *T26* | *T11* | *E26* |   |
| 01100 | E12 | T6  | T12 | E6  | 10 |
| 01101 | E13 | *T22* | *T13* | *E22* |   |
| 01110 | E14 | T14 | T14 | E14 | 11 |
| 01111 | E15 | *T30* | *T15* | *E30* |   |
| 10000 | E16 | T1  | T16 | E1  | 12 |
| 10001 | E17 | T17 | T17 | E17 | 13 |
| 10010 | E18 | T9  | T18 | E9  | 14 |
| 10011 | E19 | *T25* | *T19* | *E25* |   |
| 10100 | E20 | T5  | T20 | E5  | 15 |
| 10101 | E21 | T21 | T21 | E21 | 16 |
| 10110 | E22 | T13 | T22 | E13 | 17 |
| 10111 | E23 | *T29* | *T23* | *E29* |   |
| 11000 | E24 | T3  | T24 | E3  | 18 |
| 11001 | E25 | T19 | T25 | E19 | 19 |
| 11010 | E26 | T11 | T26 | E11 | 20 |
| 11011 | E27 | *T27* | *T27* | *E27* |   |
| 11100 | E28 | T7  | T28 | E7  | 21 |
| 11101 | E29 | *T23* | *T29* | *E23* |   |
| 11110 | E30 | T15 | T30 | E15 | 22 |
| 11111 | E31 | *T31* | *T31* | *E31* |   |

Fig. 8a
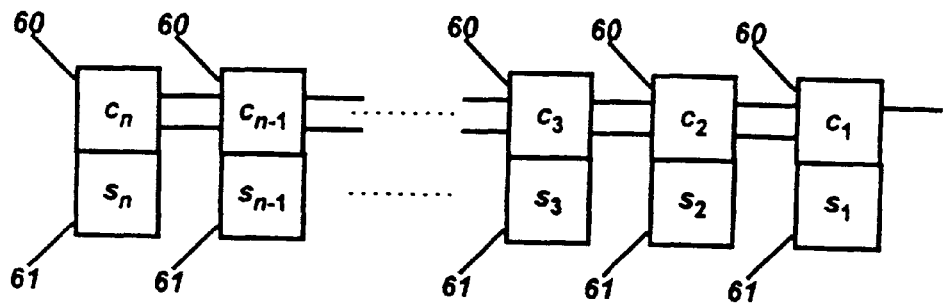
Fig. 8b
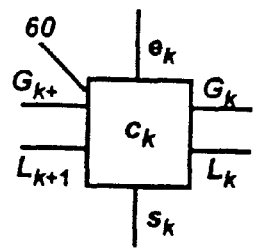
Fig. 8c
| INPUTS | | | | OUTPUT | |
|---|---|---|---|---|---|
| $G_{k+1}$ | $L_{k+1}$ | $e_k$ | $s_k$ | $G_k$ | $L_k$ |
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 0 | 0 |
| 0 | 1 | 0 | 0 | 0 | 1 |
| 0 | 1 | 0 | 1 | 0 | 1 |
| 0 | 1 | 1 | 0 | 0 | 1 |
| 0 | 1 | 1 | 1 | 0 | 1 |
| 1 | 0 | 0 | 0 | 1 | 0 |
| 1 | 0 | 0 | 1 | 1 | 0 |
| 1 | 0 | 1 | 0 | 1 | 0 |
| 1 | 0 | 1 | 1 | 1 | 0 |
| 1 | 1 | 0 | 0 | | |
| 1 | 1 | 0 | 1 | | |
| 1 | 1 | 1 | 0 | | |
| 1 | 1 | 1 | 1 | | |

| Cell Slot Position | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| Channel Number | 1 | 2 | 3 | 1 | 2 | 3 | 1 | 2 | 3 | 1 | 0 | 1 | 2 | 3 | 1 | 15 | 3 | 1 | 2 | 3 | 0 | 0 |
| Fig 9 designation | A | B | C | A | B | C | A | B | C | A |  | A | B | C | A | Fr | C | A | B | C |  |  |

Fig. 12a

| Channel $C_K$ | Size $S_K$ | Lower Boundary $L_K$ | Upper Boundary $U_K$ |
|---|---|---|---|
| 1 | 7 | 0 | 0 |
| 2 | 5 | 0 | 0 |
| 3 | 6 | 0 | 0 |
| 15 | 1 | 0 | 0 |

Fig. 12b

| Channel $C_K$ | Size $S_K$ | Lower Boundary $L_K$ | Upper Boundary $U_K$ |
|---|---|---|---|
| 1 | 7 | 31 | 0 |
| 3 | 6 | 31 | 0 |
| 2 | 5 | 31 | 0 |
| 15 | 1 | 31 | 0 |

Fig. 12c

| Channel $C_K$ | Size $S_K$ | Lower Boundary $L_K$ | Upper Boundary $U_K$ |
|---|---|---|---|
| 1 | 7 | 0 | 6 |
| 3 | 6 | 8 | 13 |
| 2 | 5 | 16 | 20 |
| 15 | 1 | 7 | 7 |

Fig. 12d

| Cell Slot Counter | Counter Address K | Channel A(K) |
|---|---|---|
| | 0 | 1 |
| | 1 | 2 |
| | 2 | 3 |
| | 3 | 1 |
| | 4 | 2 |
| | 5 | 3 |
| | 6 | 1 |
| | 7 | 2 |
| | 8 | 3 |
| | 9 | 1 |
| | 10 | 0 |
| | 11 | 1 |
| | 12 | 2 |
| | 13 | 3 |
| | 14 | 1 |
| | 15 | 0 |
| | 16 | 3 |
| | 17 | 1 |
| | 18 | 2 |
| | 19 | 3 |
| | 20 | 4 |
| | 21 | 0 |

*Fig. 13a*

| Trunk | Element | Cell Slot | Cell Slot | Element | Trunk 1 Positions | Trunk 2 Positions | Trunk 3 Positions | Position Number |
|---|---|---|---|---|---|---|---|---|
| 1 | 00000 | E0 | T0 | T0 | E0 | 1 | | | 1 |
| | 00001 | E1 | T16 | T1 | E16 | | | 3 | 2 |
| | 00010 | E2 | T8 | T2 | E8 | | 2 | | 3 |
| | 00011 | E3 | T24 | T3 | E24 | | | | |
| 2 | 00100 | E4 | T4 | T4 | E4 | 1 | | | 4 |
| | 00101 | E5 | T20 | T5 | E20 | | | 3 | 5 |
| | 00110 | E6 | T12 | T6 | E12 | | 2 | | 6 |
| | 00111 | E7 | T28 | T7 | E28 | | | | |
| | 01000 | E8 | T2 | T8 | E2 | 1 | | | 7 |
| | 01001 | E9 | T18 | T9 | E18 | | | 3 | 8 |
| | 01010 | E10 | T10 | T10 | E10 | | 2 | | 9 |
| | 01011 | E11 | T26 | T11 | E26 | | | | |
| | 01100 | E12 | T6 | T12 | E6 | | 2 | | 10 |
| | 01101 | E13 | T22 | T13 | E22 | | | | |
| | 01110 | E14 | T14 | T14 | E14 | | | 3 | 11 |
| | 01111 | E15 | T30 | T15 | E30 | | | | |
| 3 | 10000 | E16 | T1 | T16 | E1 | 1 | | | 12 |
| | 10001 | E17 | T17 | T17 | E17 | | | 3 | 13 |
| | 10010 | E18 | T9 | T18 | E9 | | 2 | | 14 |
| | 10011 | E19 | T25 | T19 | E25 | | | | |
| | 10100 | E20 | T5 | T20 | E5 | | 2 | | 15 |
| Fr | 10101 | E21 | T21 | T21 | E21 | | | | 16 |
| | 10110 | E22 | T13 | T22 | E13 | | 2 | | 17 |
| | 10111 | E23 | T29 | T23 | E29 | | | | |
| | 11000 | E24 | T3 | T24 | E3 | 1 | | | 18 |
| | 11001 | E25 | T19 | T25 | E19 | | | 3 | 19 |
| | 11010 | E26 | T11 | T26 | E11 | | 2 | | 20 |
| | 11011 | E27 | T27 | T27 | E27 | | | | |
| | 11100 | E28 | T7 | T28 | E7 | | 2 | | 21 |
| | 11101 | E29 | T23 | T29 | E23 | | | | |
| | 11110 | E30 | T15 | T30 | E15 | | | 3 | 22 |
| | 11111 | E31 | T31 | T31 | E31 | | | | |

| Position Number | Trunk | Channel | Element | Channel Position | Channel Element |
|---|---|---|---|---|---|
| 1 | 1 | 1A1 | E0 | 1P3 | 1E2 |
| 2 | 3 | 3A1 | E16 | 3P5 | 3E1 |
| 3 | 2 | 2C1 | E8 | 2P7 | 2E5 |
| 4 | 1 | 1A2 | E4 | 1P4 | 1E1 |
| 5 | 3 | 3B1 | E20 | 3P6 | 3E5 |
| 6 | 2 | 2B3 | E12 | 2P8 | 2E3 |
| 7 | 1 | 1B1 | E2 | 1P5 | 1E3 |
| 8 | 3 | 3A2 | E18 | 3P7 | 3E3 |
| 9 | 2 | 2D2 | E10 | 2P9 | 2E7 |
| 10 | 2 | 2A2 | E6 | 2P1 | 2E0 |
| 11 | 3 | 3A3 | E14 | 3P1 | 3E0 |
| 12 | 1 | 1A3 | E1 | 1P1 | 1E0 |
| 13 | 3 | 3B2 | E17 | 3P2 | 3E4 |
| 14 | 2 | 2Fr | E9 | 2P2 | 2E8 |
| 15 | 2 | 2B1 | E5 | 2P3 | 2E4 |
| 16 | | Fr | E21 | | |
| 17 | 2 | 2B2 | E13 | 2P4 | 2E2 |
| 18 | 1 | 1Fr | E3 | 1P2 | 1E4 |
| 19 | 3 | 3A4 | E19 | 3P3 | 3E2 |
| 20 | 2 | 2D1 | E11 | 2P5 | 2E6 |
| 21 | 2 | 2A1 | E7 | 2P6 | 2E1 |
| 22 | 3 | 3Fr | E15 | 3P4 | 3E6 |

Fig. 16a

| Trunk | Channel | Element | HS Trunk Position | Channel |
|---|---|---|---|---|
| 2A | A | E5 | 3 | 2B2 |
| 2A | A | E6 | 6 | 2D2 |
| 2B | B | E7 | 9 | 2C1 |
| 2B | B | E8 | 10 | 2A1 |
| 2B | B | E9 | 14 | 2B3 |
| 2C | C | E10 | 15 | 2A2 |
| 2D | D | E11 | 16 | Fr |
| 2D | D | E12 | 17 | 2Fr |
| 2Fr | Fr | E13 | 20 | 2D1 |
| | | E21 | 21 | 2B1 |

Fig. 16b

| Trunk | Channel | Element | HS Trunk Position | Channel |
|---|---|---|---|---|
| 2A | A | E6 | 3 | 2C1 |
| 2A | A | E7 | 6 | 2B3 |
| 2B | B | E5 | 9 | 2D2 |
| 2B | B | E12 | 10 | 2A2 |
| 2B | B | E13 | 14 | 2Fr |
| 2C | C | E8 | 15 | 2B1 |
| 2D | D | E9 | 16 | Fr |
| 2D | D | E10 | 17 | 2B2 |
| 2Fr | Fr | E11 | 20 | 2D1 |
| | | E21 | 21 | 2A1 |

Fig. 16c

| Trunk 2 Position | Trunk 2 Channels | HS Trunk Channels | HS Trunk Position | Trunk 2 Delay (1) | Trunk 2 Delay (2) |
|---|---|---|---|---|---|
| 7 | 2C1 | 2B2 | 3 | 2 (7:9) | 7 (9:7) |
| 8 | 2B3 | 2D2 | 6 | 3 (8:2) | 6 (2:8) |
| 9 | 2D2 | 2C1 | 9 | 8 (9:8) | 1 (8:9) |
| 1 | 2A2 | 2A1 | 10 | 2 (1:3) | 7 (3:1) |
| 2 | 2Fr | 2B3 | 14 | 2 (2:4) | 7 (4:2) |
| 3 | 2B1 | 2A2 | 15 | 3 (3:6) | 6 (6:3) |
| | | Fr | 16 | | |
| 4 | 2B2 | 2Fr | 17 | 3 (4:7) | 6 (7:4) |
| 5 | 2D1 | 2D1 | 20 | 9 (5:5) | 0 (5:5) |
| 6 | 2A1 | 2B1 | 21 | 4 (6:1) | 5 (1:6) |

*Fig. 18a*

| | | |
|---|---|---|
| 1 | Sort CHANNEL table in descending order of channel size; | |
| 2 | FOR K = 1 to $m$+1 increment 1; | Set the lower bound in the CHANNEL table to $N-1$ |
| 3 | $L_K = N - 1$; | where $N$ is the virtual frame length for the multiplexed trunk to which the channels are |
| 4 | ENDFOR; | to be assigned |
| 5 | $L_1 = 0$; | Set the lower boundary element address of the first entry in the sorted CHANNEL table (the channel with the largest number of required cell slots) to 0. The subscript 1 designates the first entry in the CHANNEL table. |
| 6 | $U_1 = S_1 - 1$; | Set the upper boundary element address of the first entry in the sorted CHANNEL table so that there will be $S_1$ cell slots assigned to the channel. |
| 7 | FOR K = 1 to $m$ increment 1; | Start of FOR loop to assign lower and upper boundaries for each channel beyond the first. |
| 8 | IF $S_{K+1} = 1$ THEN | |
| 9 | $h = 0$; | Determine the smallest power of two integer greater than or equal to the channel size for the next smaller channel K+1 in the CHANNEL table. |
| 10 | ELSE | |
| 11 | Calculate $h = 1 +$ INT($\log_2(S_{K+1} - 1)$); | H is the *virtual channel* size and h is the power of two exponent. |
| 12 | ENDIF; | |
| 13 | Calculate H = $2^h$; | |
| 14 | LT = H; | Set the initial value of LT, the trial power of two lower boundary for channel K + 1 to 0. |
| 15 | ERR = TRUE; | Set error variable ERR to TRUE. |
| 16 | FOR J = 1 to K increment 1; | Inner FOR loop to compute lower and upper boundaries aligned to H = $2^h$ power of two boundaries. The variable J points to the previous channel in the sorted CHANNEL table. |
| 17 | IF LT ≤ $U_J$ THEN | Determine if the current test value of a possible lower boundary, LT is less than or equal to the upper boundary of the previous channel in the sorted CHANNEL table. |
| 18 | LT = H × (1 + INT($U_J$ / H)); | If LT is less than the upper boundary, increment LT by the smallest number of values of H to make it greater than the upper boundary. |
| 19 | ELSE IF LT + $S_{K+1}$ ≤ $L_{J+1}$ THEN | Determine if the current value of LT plus the channel size exceeds the lower boundary of the current channel K + 1. (Note that LT + $S_{K+1}$ is 1 greater than the test upper boundary value.) |
| 20 | $L_{K+1}$ = LT; | Set the lower boundary of LT. |
| 21 | $U_{K+1}$ = LT + $S_{K+1}$ - 1; | Set the upper boundary to LT + $S_{K+1}$ - 1. |

Fig. 18b

| | | |
|---|---|---|
| 22 | IF $U_{K+1} \leq F$ THEN | Determine if the new upper bound is less than the maximum number of cells per frame F. |
| 23 | ERR = FALSE; | Set error variable ERR to FALSE. There is room for channel J + 1. |
| 24 | ENDIF; | |
| 25 | EXIT; | Leave the inner ENDFOR loop. |
| 26 | ENDIF; | |
| 27 | ENDIF; | |
| 28 | ENDFOR; | |
| 29 | IF ERR THEN SUBERR; | If ERR is TRUE, there is not enough room for all of the channels. Go to SUBERR, a error handling subroutine. |
| 30 | Sort first K rows of CHANNEL table on L, the lower boundary column; | |
| 31 | ENDFOR. | |

Input parameters

F    Frame length, that is, the number of cells per frame for the current system.

m    Number of multiplexed channels.

$S_K$    Size of channel k, that is, the number of cell slots assigned to channel $k$ ($k = 1, \ldots m$).

Program variables

ERR    A logical variable that is initialized to be TRUE and is set to FALSE if room is found in the multiplex frame for the current channel.

H    Smallest power of two number greater than or equal to the number of elements in the current channel.

h    $\log_2(H)$. That is, $h$ is the exponent in $H = 2^h$.

I    Count variable in FOR loop that determines

IE    Element address which is the transform of IT, the cell slot address variable.

IP    Cell slot Position Number.

IT    Cell slot address (a count variable in a FOR loop).

K    FOR loop count variables identifying individual channel numbers.

$L_K, U_K$    Lower and upper element address boundaries for channel $k$. The range of a channel's element addresses is $\{L_k, \ldots, U_k\}$.

LT    A multiple of H for determining if the smallest element address in which the current channel will fit on a power of two element address boundary.

N    Virtual frame length, the smallest integer power of two that is greater than F, the number of cells per frame.

n    $\log_2(N)$. That is, $n$ is the exponent in $N = 2^n$.

*Fig. 19a*

| | | |
|---|---|---|
| 32 | Calculate $n = 1 + INT(\log_2(F - 1))$; | Calculate the base two logarithm of the virtual frame length. |
| 33 | Calculate $N = 2^n$; | Calculate the virtual frame length |
| 34 | FOR K = 1 to F increment 1; | |
| 35 | $A(K) = 0$; | |
| 36 | ENDFOR | |
| 37 | IP = 0; | Set initial value of IP, the (counter) cell slot position, to 0. |
| 38 | FOR IT = 1 to N increment 1; | Start of For loop to compute channel address assigned to each physical cell slot position. The loop is executed once for each virtual frame cell slot address. |
| 39 | Compute $IE = 2^{n-1} \times IT\ MOD\ 2 + 2^{n-2} \times IT\ MOD\ 4 + \ldots + IT\ MOD\ 2^{n-1}$; | Compute the element address corresponding to the cell slot address IT. |
| 40 | IF IE ≥ F THEN EXIT; | If element address is greater than or equal to the number of cells per frame (frame length), then exit the outside FOR loop. |
| 41 | FOR K = 1 to m+1 increment 1; | Start of inner FOR loop to determine if computed element address IE is within the range of channel element address boundaries. |
| 42 | IF IE ≥ $L_K$ THEN | IF THEN loop to determine if IE is greater than or equal to the lower boundary of channel K. |
| 43 | IF IE ≤ $U_K$ THEN | IF THEN loop to determine if IE is less than or equal to the upper boundary of channel K. |
| 44 | $A(IP) = C_K$; | Assign channel number $C_K$ to cell slot IP |
| 45 | IP = IP + 1; | The cell slot Position Number IP is incremented by 1. |
| 46 | EXIT; | Exit inside FOR loop when the channel is identified. |
| 47 | ENDIF; | |
| 48 | ENDIF; | |
| 49 | ENDFOR; | End of inner FOR loop |
| 50 | ENDFOR. | End of outer FOR loop. |

Fig. 19b

Input parameters $F$ Frame length, that is, the number of cells per frame for the current system.

$m$ Number of multiplexed channels.

$S_K$ Size of channel $k$, that is, the number of cell slots assigned to channel $k$ ($k = 1, \ldots m$).

Program variables

ERR A logical variable that is initialized to be TRUE and is set to FALSE if room is found in the multiplex frame for the current channel.

H Smallest power of two number greater than or equal to the number of elements in the current channel.

$h$ $\log_2(H)$. That is, $h$ is the exponent in $H = 2^h$.

I Count variable in FOR loop that determines

IE Element address which is the transform of IT, the cell slot address variable.

IP Cell slot Position Number.

IT Cell slot address (a count variable in a FOR loop).

K FOR loop count variables identifying individual channel numbers.

$L_K, U_K$ Lower and upper element address boundaries for channel $k$. The range of a channel's element addresses is $\{L_k, \ldots, U_k\}$.

LT A multiple of H for determining if the smallest element address in which the current channel will fit on a power of two element address boundary.

N Virtual frame length, the smallest integer power of two that is greater than $F$, the number of cells per frame.

$n$ $\log_2(N)$. That is, $n$ is the exponent in $N = 2^n$.

CELL SELECTOR METHOD AND APPARATUS FOR USE IN TIME DIVISION MULTIPLEXERS AND SWITCHES

This is a Continuation of Application Ser. No. 08/606, 391, filed Feb. 23, 1996, now abandoned, which is a continuation of application Ser. No. 08/538,839 filed Oct. 4, 1995 and which issued as U.S. Pat. No. 5,502,723 on Mar. 26, 1996, which is a Continuation of Application Ser. No. 08/239,204 filed May 6, 1994, now abandoned.

BACKGROUND OF THE INVENTION

1. Field of Invention

The method and apparatus of the present invention relates to time division multiplexing and switching systems; specifically, it is a method and apparatus for establishing a plurality of communications channels embedded within a high speed transmission trunk by assigning fractional segments of the trunk's transmission capacity, called cell slots, to each of the channels to be established; more specifically, the method of the present invention creates a logical ordering of the set of cell slots within a predetermined time period called a frame, the logical ordering being reflective of each cell slot's assignment to one of the channels to be established, and then transforms the set of element addresses into a set of cell slot addresses which implicitly reflects each cell slot's logical assignment to a particular channel based on its physical position within the frame.

2. Description of the Related Art

A fundamental aspect of communications involves the establishment of a connection between one or more terminal devices and one or more other such devices. Early on, it was necessary to interconnect one telephone instrument with another so that two people could carry on a conversation. More recently, many different terminal devices are being interconnected, including computers, data and video terminals and many new types of voice terminals.

Facilitating the interconnection of one or more terminal devices with one or more other such devices requires a communication switching technique which may include a multicasting or conferencing capability. The characteristics of the requisite switching technique will vary with the application. At one extreme, one telephone is connected to one of a plurality of other telephones so that two people can hold a conversation. At the other extreme, one or more terminals will broadcast information to or collect information from a multiplicity of other terminals; broadcast radio and television (including both over-the-airwaves and cable systems) and telephone conferencing systems are examples. In the first case, switching equipment specifically designed for interconnecting telephones is used. In the broadcast case, a customer typically switches manually between channels that are all broadcast simultaneously to his terminal (i.e. a radio or television set). In the conferencing case, special equipment provides the requisite functionality. In all of these applications, a switching system selectively connects one or more terminals with one or more other terminals.

Switching systems have evolved from being totally mechanical to being electronic; the latter have been facilitated by the development in the 1960's of time division multiplexing techniques. A time division multiplexing system permits the sharing of a communication medium (typically a serial high speed trunk) among a number of conversations (conversations that may comprise voice, video or data information, or combinations thereof). To each of the users engaged in a particular one of the conversations, the serial communications medium can be made to appear exclusively dedicated to that specific conversation. For example, if there are three conversations labeled A, B, and C, the communication medium is devoted exclusively to each conversation for short periods of time. That is, a short segment from conversation A is followed by one from B followed by one from C and followed again by one from A, and so on.

Each of the interleaved conversations are said to be carried over one of a plurality of channels embedded in the communications medium. These embedded channels are not physically distinct transmission lines. Rather, they are partitions of the overall transmission capacity of the communications medium. Embedded channels define a plurality of subpaths comprising the high speed trunk, each of which carries data generated by different information sources to one or more destinations or data sinks. Thus, a time division multiplexed stream of information is a sequence of individual units of data, each uniquely associated with its respective data source(s) and sink(s), and transmitted over a communications medium in an interleaved fashion.

One of the principal requirements of any time division multiplexing system is the ability to associate each individual unit of data in the stream with the specific channel dedicated to connecting its source(s) to its destination(s). Typically this is accomplished by dividing the information transmission capacity of the communications medium into segments of time into which the individual units of data are embedded. Therefore, there must be a means for uniquely identifying each time segment with a specific channel that connects source(s) of data to destination terminal(s) and to see to it that only units of data from such source(s) are embedded within those time segments so identified.

In modern terminology, each time division segment comprising the transmission capacity of a communications medium is called a cell slot. Each unit of data embedded within a cell slot and which makes up part of the transmitted stream of information is often referred to as a cell. A cell may comprise one or more binary bits or a sample of an analog signal. Each cell slot is of a fixed time duration that is dependent upon characteristics of the system such as the size of a cell and the data transmission rate over the communications medium. The stream of cell slots are divided into frames, each comprising a predetermined number of cell slots. In typical time division multiplexing and switching systems, each of the information cells produced by the one or more sources is embedded into a unique one of the stream of cell slots (also known as time slots). Associated with each cell or cell slot is a channel identifier called a channel address, which identifies for the receiving end of the system to which channel the cell or cell slot belongs. Channel addresses can be either eplicit or implicit. An explicit address is one where the channel identifier physically comprises part of the cell with which it is associated. An implicit address is one where the channel identifier is implicitly associated with a cell as a function of the unique position, within a frame, of the cell slot in which the cell is embedded. Each cell slot position within the frame is assigned to identify a particular channel based on some predefined convention. Each multiplexing termination at the source and receiving ends of a time division multiplexed trunk must therefore be constrained to the same predefined convention.

FIGS. 1a and 1b are illustrations of the two types of addressing noted above. FIG. 1a shows an explicit addressing example while FIG. 1b shows an implicit case. In the explicit example of FIG. 1a, the contents of each Cell Slot 1 is composed of two parts, an Address Portion 2, such as $\alpha_A$, and a Payload Portion 11, such as A. In the implicit addressing case, each Cell Slot 4 contains only a payload portion. As noted above, the channel to which a particular cell slot is assigned is implicitly connoted by the cell slot's location in time (i.e. its physical location within a frame). Thus, the multiplexing devices associated with the communication system must be coordinated in accordance with some predefined convention to identify each cell slot with a particular channel. In typical systems employing implicit addressing, the convention or algorithm is fixed and therefore cannot be easily altered, especially during system operation.

Systems based on explicit addressing are called asynchronous time division multiplexing (ATDM) systems. They are asynchronous because the cells in ATDM systems have their channel addresses attached (see FIG. 1a) and therefore are not position referenced for purposes of identifying the channel to which the cell slot in which they are embedded belongs. Those systems based on implicit addressing are called synchronous time division multiplexing (STDM) systems. They are synchronous so that the sending and receiving multiplexers have the same frame of reference for identifying the channel to which each cell slot belongs based on its unique position in time.

In certain contexts, it is an advantage that explicit addressing ATDM systems can send cells at any time and therefore in any order, while in STDM systems, cells must be sent synchronously and therefore in a predetermined order. The arbitrary ordering that is the essence of ATDM has been the subject of much research and system implementation over the past 25 years or so. The history of these efforts has been well chronicled in a paper by A. G. Fraser, "Early Experiments with Asynchronous Time Division Networks", IEEE Network, Vol. 7, no. 1, pp. 12–26, (January 1993) incorporated herein by reference.

ATDM systems have been developed primarily for their advantageous application to data communications. The asynchronous character of ATDM is well suited to deal with the so-called bursty nature of data transmissions. Typically in data communication applications, the need for sending information occurs sporadically, in bursts. When a particular source wants to transmit information, it is often desirable to send it quickly. Thus, there is need for adequate communication channel transmission capacity on demand. Between the data bursts generated by a source, however, there is no reason to allocate trunk capacity to the channel over which that source is assigned to transmit. In conventional STDM circuit switching systems, trunk capacity is allocated up front for each channel through establishment of a physical circuit; a channel handling bursty data is therefore idle between bursts. This results in inefficient utilization of overall trunk transmission capacity.

The desire to achieve more efficient use of trunk capacity by STDM systems operating in the bursty data transmission context has led to the notion that a high capacity communication trunk could be shared among data communication sources (and thus channels) on a statistical basis. This idea rests on the assumption that the probability of more than a limited number of the total number of data communication sources will have data to send at the same time is small. Thus, even if the sum of the desired peak transmission rates from the data communication sources exceeds the total capacity of the communication trunk, the probability is high that there will be enough trunk capacity to handle the actual load at any given time. This will be true if the average load to be sent from the data communication sources is less than trunk capacity. In practical applications, however, delays for individual users continue to occur unless the average load is substantially less than the total trunk capacity.

ATDM techniques have thus become the defacto method of designing and building high speed multiplexing and switching systems. Devices currently in the market include statistical multiplexers and packet switches, designed for data traffic. Newer Asynchronous Transfer Mode (ATM) switches are being implemented as a part of Broadband Integrated Services Digital Networks (B-ISDN) as well as local network switches.

Another one of the advantages of ATDM technology over known STDM technology is its ability to support virtual circuits. A virtual circuit is a circuit (a connection between one or more signal sources and one or more signal sinks, which are involved in a specific conversation, via a communications medium) that has been established logically within a network, but is not physically connected until a sending terminal has information to transmit. The advantage of a virtual circuit is that the call establishment phase of implementing a network connection is performed only once. Thus, although trunk transmission capacity has not yet been physically allocated, the logisitics of establishing such a connection have already been put in place such that the physical connections necessary to permit transmission over the trunk can be made quickly when necessary. This establishes a physical route over the trunk which does not waste channel capacity when not needed and which maintains a high probability that sufficient capacity will exist when information must be transmitted. As previously mentioned, typical STDM systems are not suited to establishing virtual circuits because they have heretofore required an initial assignment of cell slots to channels as a matter of convention which, once established, is not easily altered during operation.

Although there has been great emphasis on ATDM technology, it possesses a number of significant disadvantages:

(a) As can be seen from FIG. 1a, explicit addressing demands that some of the communication trunk capacity be devoted to addressing, resulting in wasted capacity that cannot be allocated to information transmission.

(b) Because of the required addressing overhead, a tradeoff must be made between the amount of channel capacity devoted to address information versus payload information. It is desirable to minimize the relative amount of capacity devoted to addressing. The payload portion of the cell must therefore be made large compared to the address portion to accomplish this. Unless the cell size is fixed, additional overhead is required to designate the length of each cell (as is done in most packet switching systems such as Frame Relay networks). This is one reason that newer cell-switching networks, including ATM and Switched Multimegabit Data Service (SMDS) make use of fixed cell sizes.

(c) The minimum size of the address portion of a cell is determined by two factors: (1) the total number of terminals that might be connected (and their addresses) or (2) by the smallest number of virtual and real circuits that need be connected on a link simultaneously. For very large networks, such as the international public digital network, the number of addresses required greatly exceeds those needed to designate individual circuits on a multiplexed link. Therefore, a choice has been made for services such as ATM that limits the length of the address field to the anticipated maximum number of simultaneous link connections. This choice, while improving utilization efficiency of trunk capacity, increases the complexity of a network since each channel address must be mapped on a link by link basis to global network addresses.

(d) If a communication error occurs during transmission of the address portion of a cell, a switching node cannot deliver the payload to the proper destination. To help overcome this problem, a certain amount of the transmission capacity is also devoted to error detection; the result is a further increase in overhead. (For example, ATM has standardized on a cell size of 53 bytes (424 bits) of which 48 bytes (384 bits) are payload data, 4 bytes (32 bits) are address information, and 1 byte (8 bits) is devoted to error detection).

(e) Channel error rate has a profound effect on ATDM systems depending on the nature of the applications. In data applications, an error in transmitting a cell from a source to a sink can be detected by the application and a request for re-transmission can be sent to the source. This approach is tolerable because data transfers are usually not extremely time dependent. For most non-data applications, however, re-transmission schemes potentially insert delays that can be intolerably large and variable. An error in the header portion of a cell is particularly disastrous because switching nodes cannot determine the destination of the cell requiring that the cell's entire contents be dropped. This characteristic of cell based systems necessitates very low error rate transmission facilities with their attendent high costs and low reliability.

(f) It is desirable to keep the overall cell size small because larger cell sizes increase buffering requirements at switching nodes. Buffer storage results in transport delay through a switch node that can seriously degrade communication service where total communication trunk capacity is limited. For example, ATM results in small delays if communication facilities of the order of 45 megabits per second (Mbps) or more are used. At lower rates, the delay can limit interactive communication efficiency. Further, as cell size increases, the amount of buffering increases which leads to larger buffers consuming greater power and chip area. Finally, buffers must be managed to prioritize data traffic which increases control complexity.

(g) In an integrated network that is devoted to voice and video communication along with data, most of the trunk capacity typically must be devoted to voice and video. These services are isochronous in nature; they send information at a fixed clocking rate that can endure for extended periods of time. They are not "bursty" information sources such as those found in data communications applications. To accommodate isochronous channels, ATDM networks require complex clocking subsystems.

(h) Multicasting and conferencing can be accomplished by replicating cells or by defining "group addresses" that are interpreted at each node to define one or more destinations. Both approaches require complex manipulation of channel addresses. In conventional voice and data communication applications, multicasting and conferencing are fringe services. For video and multimedia applications, however, the ability to support multicasting becomes a much more important network requirement.

STDM systems do not exhibit these disadvantages. In particular, they do not confront the designer with the delay, congestion and clocking problems of ATDM systems. All known STDM systems do, however, exhibit one or more of the following disadvantages:

(a) Circuit and trunk speeds are constrained to conform to the digital time multiplexing hierarchy standards that have been established by national and international standards organizations. Even though the standards facilitate interworking between equipment of different manufacturers and between different countries, the number of speeds is limited and they are extremely inflexible during system operation.

(b) Current STDM switching systems have complex signaling systems that require large amounts of information to be transmitted to establish circuit connections.

(c) Current STDM architectures require hierarchical physical structures that are cumbersome and expensive.

(d) Almost all switching systems are constrained to minimum data rates of 64,000 bits per second (bps) and to, at most, integer multiples thereof.

(e) Buffer memory amounting to one or more bytes per multiplex frame are required.

(f) Switch transport delays of several milliseconds are common even though standard frame lengths are 125 microseconds ($\mu$sec).

(g) Providing virtual switched circuits is not practical with existing architectures.

(h) Providing multicasting and conferencing are not inherently a part of STDM switching systems.

They are add-on modules and subsystems that must be provisioned separately.

Thus, there is a need in the art for systems which can combine the advantages of ATDM systems such as their ability to reallocate channel capacity during real time operation in response to bursty data sources (i.e. through the use of virtual circuits and "bandwidth on demand"), with the advantages of STDM systems such as their ability to minimize transmission capacity overhead through implicit channel addressing.

BRIEF SUMMARY OF THE INVENTION

An objective of the present invention is to overcome the disadvantages of both current ATDM and STDM multiplexing and switching systems by implementing a new and nonobvious method of, and apparatus for, assigning cell slots to form embedded channels within a communications medium which has as one of its advantages the ability to support the establishment of virtual circuits (heretofore an advantage associated primarily with ATDM systems) to better handle the vagaries of bursty data, but which also provides the advantage of implicit addressing (and its low overhead) heretofore associated primarily with STDM systems.

A further objective of the present invention is to provide a methodology by which various embodiments of the apparatus of the invention can easily reassign cell slots to embedded channels in an an automated fashion and in real time, in response to system requests such as to add or delete channels or to increase or decrease capacity for established channels.

A still further objective of the present invention is to provide a methodology by which the characteristics of the assignment profile can be easily altered in real time to achieve any number of desired benefits. As discussed in the previous section, ATDM systems are favored because they are able to respond in real-time to changes in demand for trunk transmission capacity most often associated with bursty data sources so that transmission capacity is not wasted. This more efficient use of trunk capacity is offset, however, by the capacity expenditures associated with explicit addressing. While STDM systems require little or no capacity expenditures for their implicit addressing schemes, these schemes are highly standardized, inflexible and therefore ill-suited for responding in real-time to changes in demand for channel capacity; channels dedicated to bursty data sources will remain idle in between bursts from those sources.

As with typical STDM systems, the present invention form is embedded channels within a trunk by assigning each of a subset of the set of all cell slots within a predetermined frame to carry only those information cells which are to be transmitted over a particular channel (i.e. between data source(s) and data sink(s)). Unlike known STDM systems, however, the present invention implements a method of assigning cell slots to channels which permits a reassignment of the cell slots in real time based on increasing or decreasing demand for channel capacity or to change the spatial distribution profile of the cell slot assignments within the frame to the set of channels to be established.

In the general case, the method of the present invention achieves a desired assignment of the physical cell slots comprising a multiplexed frame to embedded channels by ascribing multiple labels to each one of the cell slots within the frame. One of these labels, called an element address, uniquely identifies each of the cell slots of the frame and facilitates a logical assignment of the cell it identifies with one of the channels to be established between one or more specific data sources and sinks. A second of these labels, called a cell slot address, uniquely identifies each cell slot of the frame by its relative physical position within the frame. Each of the element addresses (used to logically associate a cell slot with a channel to be established) is uniquely linked on a one-to-one basis with one of the set of cell slot addresses (used to identify relative position of a cell slot within the frame) through a predetermined transform. This linking of element addresses to cell slot addresses results in a mapping of the channels to cell slots based on their ordered physical position within the frame. The mapping characteristics are directly a function of the nature of the transform, which can be any predetermined transform designed to achieve desired mapping characteristics. A third label, called a position number, is uniquely associated with each one of the cell slot addresses to connote the ordinal position within the frame of the cell slot identified by the cell slot address with which the position number is associated. Because the cell slot addresses form a position-ordered set, each successively greater cell slot address is related to a successively larger ordinal position number. Position numbers are particularly important when the set of cell slot addresses for a frame of cell slots is not contiguous (i.e. when there are gaps between cell slot address values).

There are a large number of conceivable transforms that can be implemented with the present invention. A general set of transforms is $\Lambda\{*\}$, where the set of cell slot addresses $\{T\}=\{T0, T1, \ldots, T[F-1]\}$ and the set of element addresses $\{E\}=\{E0, E1, \ldots, E[F-1]\}$ are defined such that all E and T values are in the same domain, such that $\{T\}=\Lambda\{E\}$ which represents a one-to-one mapping of element addresses to cell slot addresses. Because the mapping is one-to-one, every such transform $\Lambda$ has an inverse $\Lambda^{-1}$ such that $\{E\}=\Lambda^{-1}\{T\}=\Lambda^{-1}\{\Lambda\{E\}\}$ and $\{T\}=\Lambda^{-1}\{\Lambda\{T\}\}$. In other words, $\Lambda^{-1}\Lambda=I$ where I is the identity transform that maps a set of addresses to itself. A particularly attractive subclass of this general class of transforms is comprised of symmetric transforms where $\Lambda^{-1}=\Lambda$ and $\Lambda\Lambda=\Lambda^2=I$. The particular transform chosen to illustrate the preferred embodiments below is of this symmetric subclass.

In general, the method of the present invention defines a channel by assigning one or more ranges of element addresses to the channel. The resulting set of cell slot addresses (and thus the resulting spatial distribution of cell slot position assignments within the frame for the channel) that is generated by applying a transform to the element addresses so assigned depends on the nature of the transform that is implemented. For example, one desirable characteristic produced by a transform could be an equal spacing within the multiplexed frame of the cell slot positions assigned to each of the channels to be implemented. The result of achieving such a characteristic would be a multiplexing system that requires minimum buffering and hence minimum delay in transporting signals over high speed trunks from sources to sinks. Another transform might be chosen to produce a mapping characteristic that makes the cell slot positions assigned to a particular channel appear random in nature. Such a characteristic might be desirable in the context of maintaining privacy or security by preventing third parties from deciphering messages transmitted over specific channels. In any context, knowledge of the transform used at any particular time can be restricted to the sending and receiving multiplexer stations. For a given set of element and cell slot addresses, the number of possible transforms that can be implemented by the present invention is quite large. One of skill in the art will be able to choose or design transforms that fit the requirements of a myriad of applications.

In the general case, the apparatus of the invention sequences itself in accordance with either the set of cell slot addresses or the set of ordinal position numbers associated with each of the cell slots of a frame. As it sequences through the cell slots of the frame, the apparatus of the invention uses the current mapping of cell slots to channels as provided by the method of the invention to determine to which channel the current cell slot in the sequence has been assigned. The apparatus uses this determination to select a cell from an appropriate source to fill a cell slot in the "Send" context, or to present the contents of the current cell slot in the sequence to the appropriate sink(s) in the "Receive" context. The apparatus of the invention also has a means by which it can be programmed with a new mapping of cell slots to channels as established by the method of the invention.

The advantage of the present invention inheres in that it provides a flexible and easily automated methodology by which capacity can be reallocated when channels are added or dropped, and/or by which capacity can be reallocated among the same number of channels. The present invention can accomplish this either by altering the logical assignment of the cell slots and then applying the currently defined transform to the new set, or by changing the transform used to map the channels to physical cell slot positions. A still further advantage of the present invention is that very little information must be transmitted to the receiving end of the trunk to communicate any change in the channel assignments. Finally, the method of the present invention is easily implemented in hardware and/or firmware.

Existing space-time and time-space multiplexers incorporate cell slot selectors that do not provide the advantages of the present invention. The present invention is a new paradigm for flexibly allocating cell slots to embedded channels and is applicable to any time division multiplexing or switching system. Several objectives and advantages of the present invention are:

a) to provide time division multiplexing and switching where the cell size can be as small as desired, down to even a single bit or analog signal sample;

b) to provide an addressing technique that can be communicated from a sending to a receiving multiplex station with small message sizes;

c) to provide "bandwidth on demand" switching where an individual channel can be any integer multiple of some minimum rate such as 800 or 8,000 bits per second;

d) to provide a means of channel allocation that utilizes trunk transmission capacity more efficiently than current practice;

e) to provide the equivalent of statistical multiplexing without requiring the use of large buffers within switch nodes;

f) to rapidly change the mix of embedded channels subdividing the transmission capacity of a high speed trunk;

g) assigning cells to a channel so that the cells are nearly uniformly spaced in time and/or space within some frame of reference, limiting input and output buffer sizes to only a few bits or cells in length;

h) to minimize transport delays through a multiplexing or switching node to only a few cell periods as measured at the nominal transmission rate of a switched channel;

i) to provide the foundation for a network architecture that will support virtual circuits in an STDM environment;

j) to provide a mechanism that will multiplex signals in both space and time, causing cell slots to appear in a deterministic order;

k) to provide an information transport mechanism that, after an initial connection is made, does not mis-route information even when transmission errors occur;

l) to provide for multicasting as an indigenous part of multiplexers and switches; and m) to provide for aggregation of signals at tandem nodes that can become a part of a conferencing system.

Further objectives and advantages of the present invention are to provide a general purpose paradigm that can be adapted to efficient implementation of multiplexing and switching networks conforming to existing industry standards, as well as to provide implementations of these networks that can meet future communication requirements through non-obsolescent system structures.

BRIEF DESCRIPTION OF THE DRAWINGS

FIGS. 5a and 5b contain tables that illustrate specific examples of the methodology underlying the preferred embodiments of the invention.

FIG. 8a is a detailed block diagram of an embodiment of comparator/stores used within the invention.

FIG. 8b is a block diagram of a single-bit comparator stage used in the comparator/store of FIG. 8a.

FIG. 8c is a table which describes the logic function which is embodied within the comparator stage of FIG. 8b.

FIGS. 12a through 12d are tables that illustrate the features of the pseudo-program shown in FIGS. 18 and 19 for the example illustrated in FIG. 9.

FIGS. 13a through 13d are tables illustrating an alternate preferred embodiment that allows Position Numbers to identify cell slot locations in space as well as in time.

FIG. 14 is a table capable of being generated by a microprocessor embodiment of the invention.

FIGS. 16a, b and c are tables that illustrate an extension of the embodiment, based on FIGS. 13a–13d, 14 and 15b–15d, that allows direct embedding of channels in a mix of time and space divided cell sources and sinks.

FIGS. 18a and 18b show a pseudo-program segment that determines element address upper and lower boundaries for one embodiment of the invention.

FIGS. 19a and 19b show a pseudo-program segment that determines channel address numbers for each cell slot position in a multiplex frame.

DETAILED DESCRIPTION OF THE INVENTION

Background

Figure 1A:
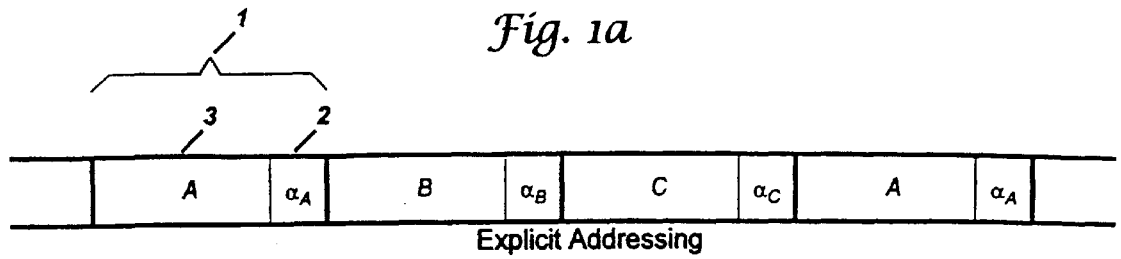
FIGS. 1a and 1b show prior art examples of time division multiplex streams of information based on explicit and implicit cell addressing respectively.
Figure 1B:
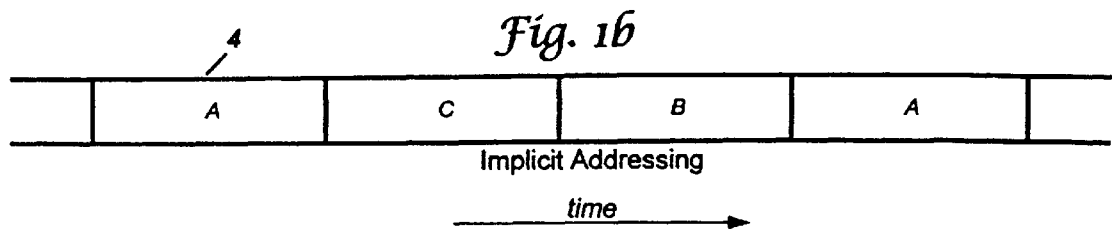
Figure 2A:
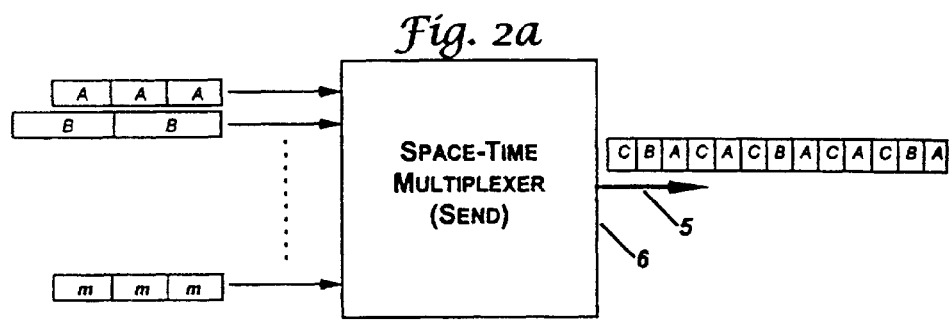
FIGS. 2a–2c illustrate various time division multiplexing and switching arrangements based on multiplexers which can incorporate Cell Slot Selectors of the present invention.
Figure 2B:
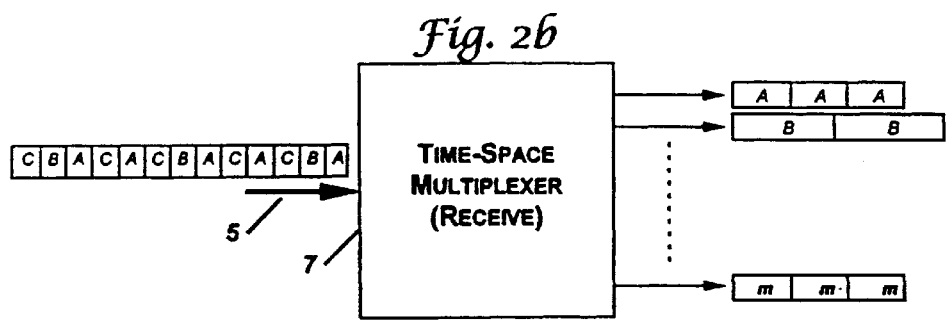

Both ATDM and SDTM systems are typically based on time division principles implemented with multiplexers and switches in the form of time-space, space-time or time-space-time structures. These time division multiplexers and switches are therefore comprised of devices that, at the sending end, assemble data from multiple sources into a sequence of cells which are embedded in appropriate cell slots, as well as devices that, at the receiving end, disassemble the data stream at another physical location such that the cells are extracted from their cell slots and presented to their appropriate data sinks. FIGS. 2a and 2b illustrate the principles involved. FIG. 2a shows a High Speed Trunk 5 connected to a Space-Time Multiplexer 6. Such a device is typically used as a part of a time division multiplexer where a plurality of inputs is sampled from data sources and the samples (i.e. the cells) are placed in succession (i.e. embedded within cell slots) on a time division multiplexed output trunk. FIG. 2b shows a Time-Space Multiplexer 7 that performs the inverse operation of that shown in FIG. 2a; a time division multiplexed trunk is demultiplexed by extracting the cells from their respective cell slots and feeding them into the appropriate data sinks in accordance with their explicit or implicit channel addresses.

Figure 2C:
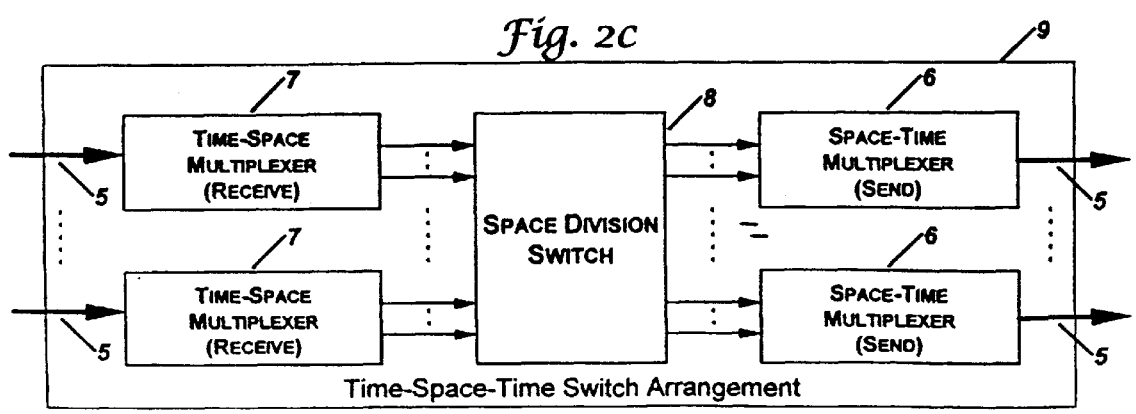

FIG. 2c shows how a plurality of Space-Time Multiplexers 6 and Time-Space Multiplexers 7 might be combined with a Space Division Switch 8 to create a tandem Time Division Switch 9. A Time Division Switch 9 provides connections between a number of input data sources and output data sinks using digital time division multiplexing techniques. The embedded channels of input time division multiplexed High Speed Trunks 5 are converted to physical circuits by Time-Space Multiplexers 7. The physical circuits are then input to Space Division Switch 8 which connects each incoming physical circuit to an outgoing physical circuit on the right side of Space Division Switch 8. The outgoing physical circuits from Space Division Switch 8 are in turn connected to Space-Time Multiplexers 6 which provide time division multiplexed High Speed Trunks 5 that go on to other destinations. Information sources and sinks remotely connected to the Time Division Switch 9 could be themselves time division multiplexers as illustrated in FIGS. 2a and 2b. Although not shown, the Space Division Switch 8 may include local physical circuit connections to sources and/or sinks.

In typical applications, an arrangement such as that of FIG. 2a could be used to concentrate traffic from a plurality of information sources to transmit a time division multiplexed stream to a distant location. There, a demultiplexer arrangement such as that of FIG. 2b could be located. Such pairs of multiplexing and demultiplexing arrangements are the essence of time division multiplexing networks. By interspersing one or more Space Division Switches 8 as illustrated in FIG. 2c, time division switched networks can be constructed.

Figure 3A:
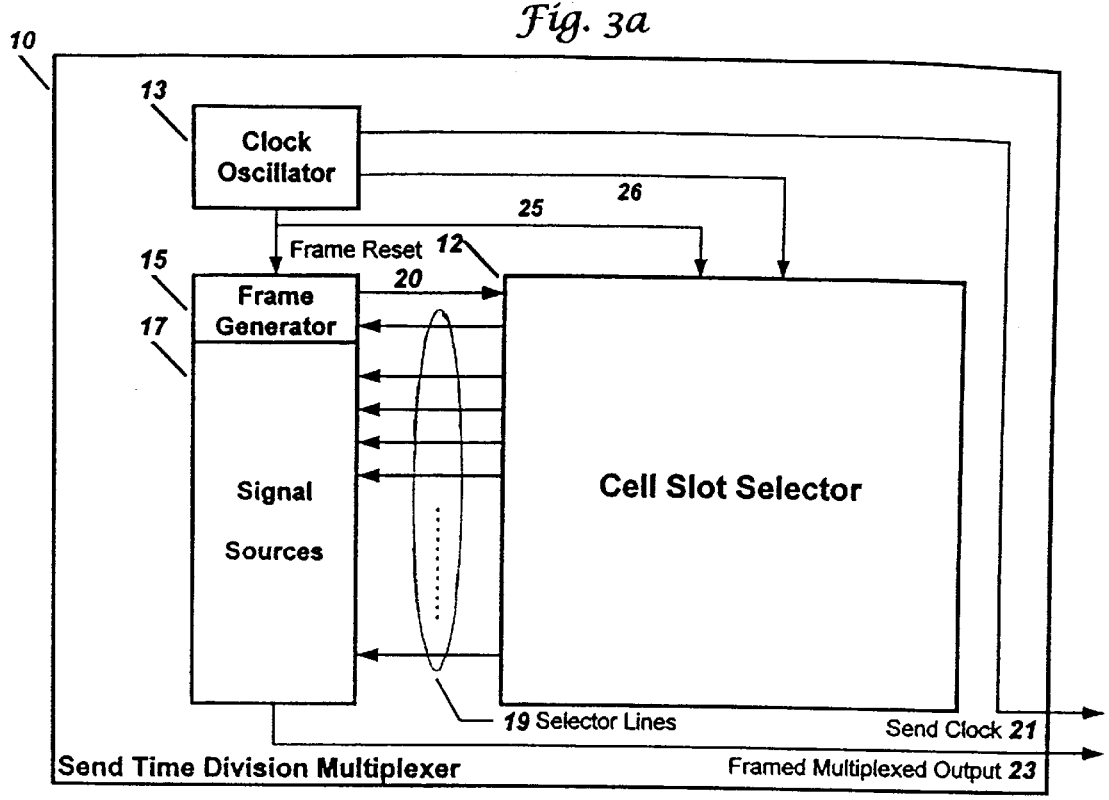
FIGS. 3a and 3b show detailed block diagrams of typical prior art send and receive time division multiplexer systems in which Cell Slot Selectors of the present invention can be used.
Figure 3B:
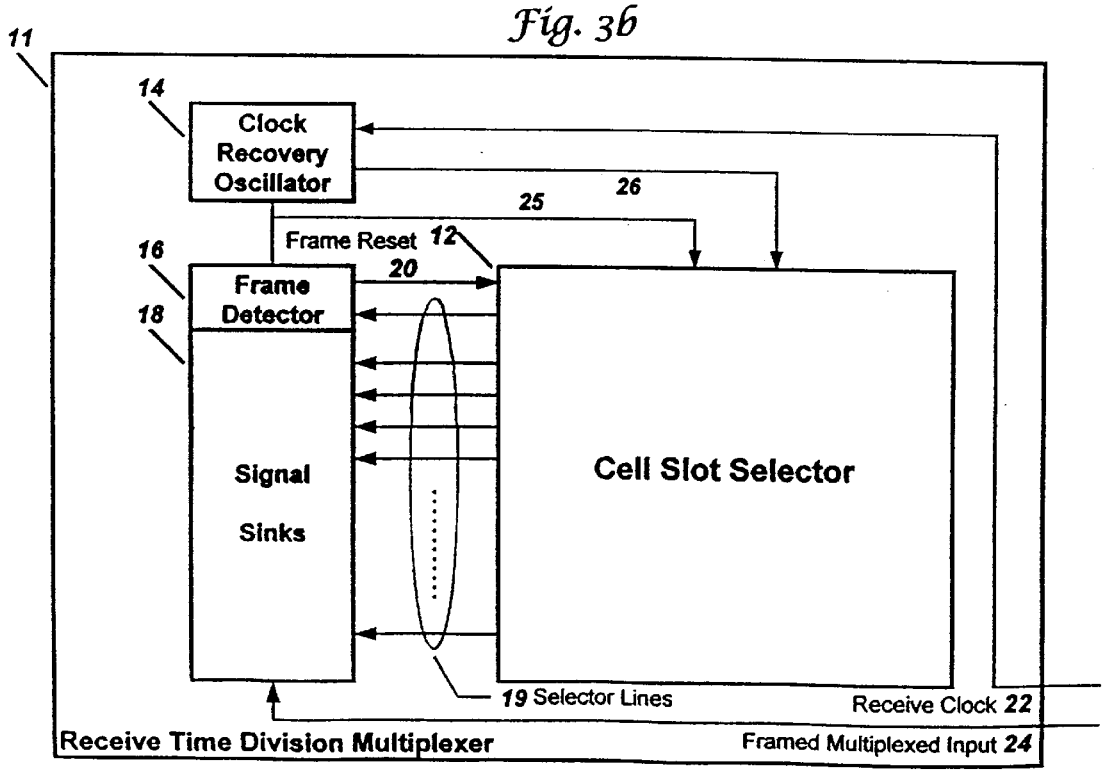

FIG. 3a is a block level illustration of a typical Send Time Division Multiplexer System 10 (corresponding to the Space-Time Multiplexer 6 of FIGS. 2b and 2c), while FIG. 3b is a block level illustration of a typical Receive Time Division Multiplexer System 11 (corresponding to the Time-Space Multiplexer 7 of FIGS. 2b and 2c). Both the Send Time Division Multiplexer System 10 and the Receive Time Division Multiplexer System 11 employ a Cell Slot Selector 12 which can be a prior art Cell Slot Selector or a Cell Slot Selector of the present invention. The Send Time Division Multiplexer System 10 is coupled to a High Speed Trunk 5 (as shown in FIG. 2c) via its Framed Multiplex Output Signal 23, while Receive Time Division Multiplexer System 11 is coupled to a High Speed Trunk 5 via Framed Multiplex Input Signal 24.

Figure 4:
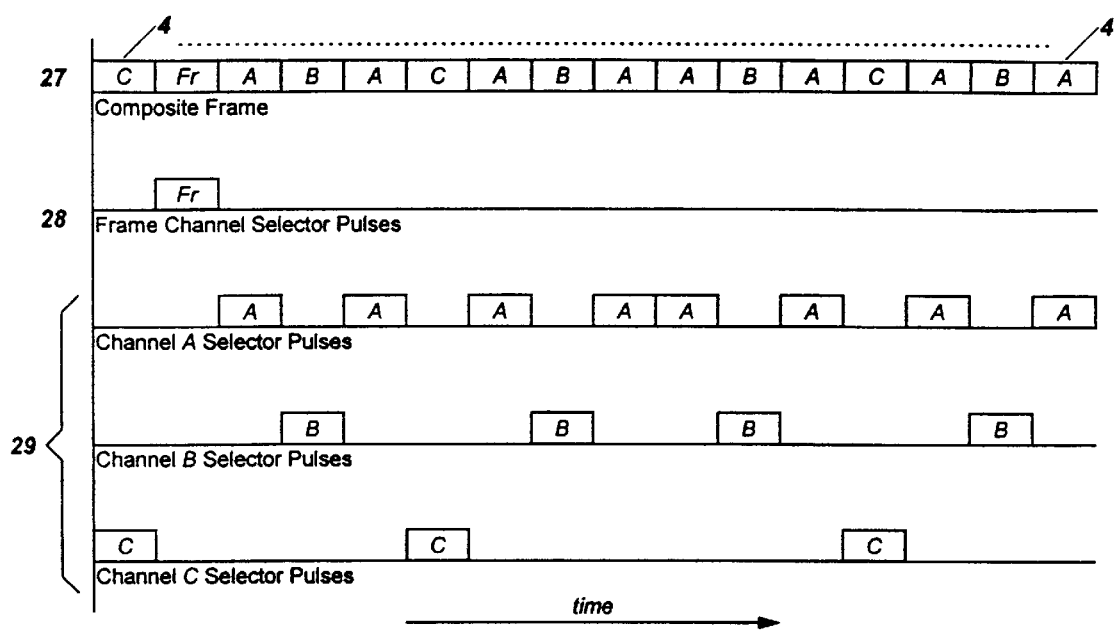
FIG. 4 illustrates the operation of Cell Slot Selectors of the present invention on a composite signal frame that is either sent to or received from a remote multiplexer system.

To understand the theory of operation of the invention, assume that there is a predetermined number of cell slots comprising each transmitted frame. An example of a Composite Frame 27 comprising Cell Slots 4, generated by Send Time Division Multiplexer System 10 and output onto a High Speed Trunk 5 via Framed Multiplex Output Signal 23, is illustrated in FIG. 4. The Composite Frame 27 is received by Receive Time Division Multiplexer System 11 from the High Speed Trunk 5 via Framed Multiplex Input Signal 24. Assuming that the transfer rate of the High Speed Trunk 5 is $f_c$ cells per second, and assuming that the period of a frame is $\tau_F$ (typically $\tau_{Fr}$ is 125 $\mu$sec long), the number of Cell Slots 4 in a Composite Frame 27 (designated as F), will be dictated by the following equation:

$$F = f_c \tau_{Fr}$$

Both the Send Time Division Multiplexer System 10 and the Receive Time Division Multiplexer System 11 contain three complementary elements. Two perform clocking and frame alignment, and one contains either signal sources or signal sinks respectively.

As shown in FIG. 3, the Send Time Division Multiplexer System 10 comprises a Clock Oscillator 13 that provides timing signals for the entire system. In particular, it generates a clocking signal equal to the rate $f_c$ at appropriate phases to cause proper operation of the Cell Slot Selector 12, as well as other elements of the multiplexer. A Clock Recovery Oscillator 14 performs functions in the Receive time Division Multiplexer System 11 that are analagous to the Clock Oscillator 13. The Clock Oscillator 13 is the source of timing for the system, and may be either free ruining, or may be slaved to a remote stable clock oscillator external to the system. Clock Recovery Oscillator 14 is slaved to a Clock Oscillator 13 that is associated with one of the sources of the multiplexed signals, or it is slaved to a clock that is synchronized therewith.

The Send Time Division Multiplexer System 10 generates appropriate framing signals via Frame Generator 15 to delimit each frame. A corresponding Frame Detector 16 is included in the Receive Time Division Multiplexer System 11 portion of an overall multiplexing/demultiplexing system.

Clocking and framing techniques are well known in the art and are not relied upon for patentability of the present invention. Any details of specific implementations of these techniques are included only for providing a context for discussion of the invention and are not a prerequisite to for use.

Included within a Send Time Division Multiplexer System 10 and Receive Time Division Multiplexer System 11 are Signal Sources 17 and Signal Sinks 18, respectively. The purpose of any Cell Slot Selector 12 (whether it is one from the prior art or one made in accordance with the present invention) within a Send Time Division Multiplexer System 10 is to effectuate the assignment of cell slots to channels by generating a unique selection signal at the appropriate time to cause one cell from a particular signal source to be placed on an outbound time division multiplexed communication trunk. By generating the select signal at the appropriate time, the Cell Slot Selector 12 inserts the cell into a cell slot which is assigned to the channel established to connect the source of that cell to its destination sink(s). Similarly, it is the purpose of any Cell Slot Selector 12 within a Receive Time Division Multiplexer System 11 to generate a unique selection signal at the appropriate time to cause one cell, contained within a cell slot which is assigned to a channel established to carry information cells from the source of that cell to one or more specified sinks over an inbound time division multiplexed communication trunk, to be extracted from the cell slot and thereby delivered to the specified destination(s). A set of Selector Lines 19 for these purposes are shown in both FIGS. 3a and 3b.

The Clock Oscillator 13 and the Clock Recovery Oscillator 14 provide timing references to the Frame Generator 15 and Frame Detector 16 and to the Cell Slot Selector 12 in each multiplexer system. The Frame Generator 15 and Frame Detector 16 each produces a Frame Reset Signal 20 that synchronizes the Cell Slot Selector f2 in the Send Time Division Multiplexer System 10 and Receive Time Division Multiplexer System 11 respectively.

Figure 6:
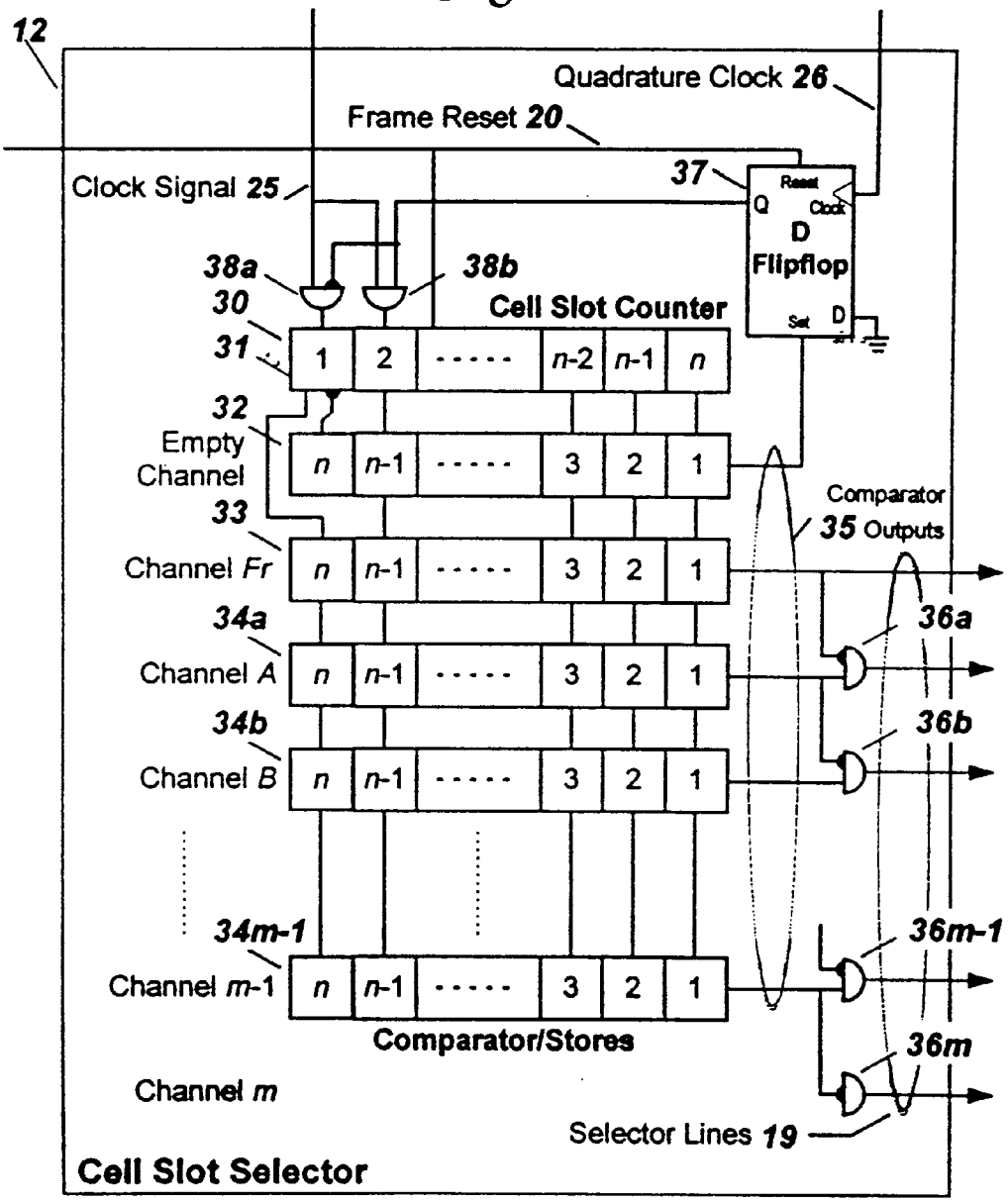
FIG. 6 is a detailed block diagram of the preferred embodiment of the invention.

The Clock Oscillator 13 outputs a Send Clock Signal 21 to the sending transmission trunk for signal synchronization. The Clock Recovery Oscillator 14 accepts a Receive Clock Signal 22 from the receiving transmission trunk and is slaved in frequency and phase to it. The system Framed Multiplex Output Signal 23 is synchronized to the Send Clock Signal 21. The Framed Multiplex Input Signal 24 arrives synchronously with the Receive Clock Signal 22 so that the slaved Clock Recovery Oscillator 14 provides proper system timing to the entire Receive Time Division Multiplexer System 11. Clock Signal 25 and Quadrature Clock 26 are signals that clock the logic circuitry comprising the first preferred embodiment of the present invention as shown in FIG. 6.

FIG. 4 illustrates the input and outputs which reflect the operation of a Cell Slot Selector 12 in both send and receive multiplexer systems. Shown at the top of the figure is a Composite Frame 27 that might appear as an input signal on the connection labeled Framed Multiplex Output Signal 23 of FIG. 3a or on Framed Multiplex Input Signal 24 of FIG. 3b. Composite Frame 27 is a multiplex signal composed of a frame cell slot Fr and a plurality of Cell Slots 4 labeled A, B and C in accordance with their association with three different channels interconnecting specific signal sources and sinks. Each cell slot labeled A carries information cells which are produced by the same source(s) or are destined for the same sink(s), and likewise for cell slots B and C. Cell slot Fr contains information indicative of a frame delimiter. The Frame Channel Selector Pulses 28 and the Channel Selector Pulses 29 are the respective outputs from the Cell Slot Selector 12 of a Send Time Division Multiplexer System 10 or of a Receive Time Division Multiplexer System 11.

In the send multiplexer case, the Frame Channel Selector Pulses 28 may be used to sample the output of the Frame Generator 15 of FIG. 3. One or more cell slots of every time multiplex frame can be assigned to contain frame cells. Usually, the contents of each frame cell slot (i.e. frame cell) conforms to a unique pattern chosen to achieve frame synchronization between receive and sending time division multiplexers. In the receive multiplexer case, the Frame Channel Selector Pulses 28 select cell slots containing Fr cells from the Framed Multiplex Input Signal 24 and present them to the Frame Detector 16. This is done both for initial synchronization of the Receive Time Division Multiplexer System 11 and, during subsequent operation, to assure that frame synchronization is maintained.

Within a Send Time Division Multiplexer System 10, the Composite Frame 27 can be thought of as a serial bus of Cell Slots 4 into which cells from signal sources are inserted. Unless used as part of a conferencing system, as described below in an alternate preferred embodiment of the invention, the Cell Slot Selector 12 assures that only one selector pulse occurs at any time on the plurality of Selector Lines 19. This provides the required interleaving of cells from the plurality of signal sources.

Within a Receive Time Division Multiplexer System 11, the Composite Frame 27 can also be thought of as a serial bus of cell slots containing information cells. In this case, cells are extracted from cell slots of the bus and delivered to the appropriate signal sinks one cell at a time. Unless used as part of a multicasting system, as described below in an alternate embodiment of the invention, the Cell Slot Selector 12 assures that only one selector pulse occurs at any time on the plurality of Selector Lines 19. Thus, the contents of each cell slot in the series are delivered to the appropriate signal sink.

Send Time Division Multiplexer System 10 and Receive Time Division Multiplexer System 11 may not require a selector pulse to be supplied to Frame Generator 15 or a frame cell presented to Frame Detector 16, to send cells to or select cells from the appropriate cell slots of a time division multiplex bus.

First Preferred Embodiment

A first preferred embodiment of the apparatus and method of the present invention establishes embedded channels by assigning the set of cell slots comprising a time division multiplex frame to each of a number of channels to be embedded within a time division multiplex trunk. As can be seen from the detailed description that follows, implementation of the first preferred embodiment of the method of the invention results in a Cell Slot Selector apparatus that provides the following:

1. a frame of a time division multiplex system that can be any integer number of cell slots in length;

2. the assignment of a subset of the integer number of cell slots per frame to carry information cells generated by a particular source to form a single embedded channel, whereby the particular assignment is connoted by the ordinal position of the cell slots within the frame;

3. the approximately uniform spacing within the frame of the cell slots assigned to a particular embedded channel;

4. the rapid addition or deletion of embedded channels to or from the trunk in real time; and 5. the reassignment of the set of cell slots to existing or additional channels in real time.

Figure 5C:
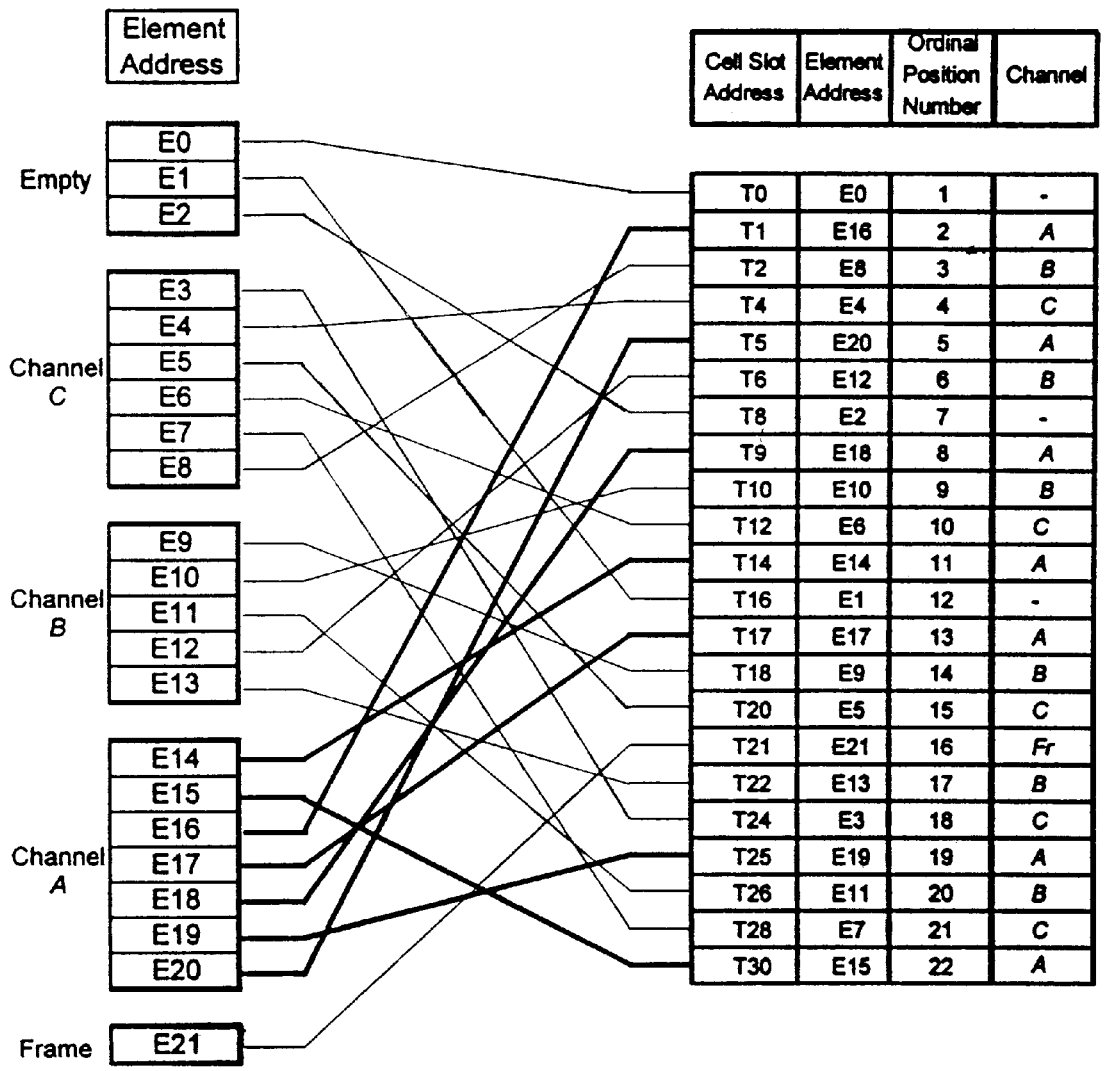
FIG. 5c illustrates the mapping of the specific channels to be established to the cell slots of the frame in accordance with the example embodied in the table of FIG. 5b and as illustrated in FIG. 7.
Figure 5D:
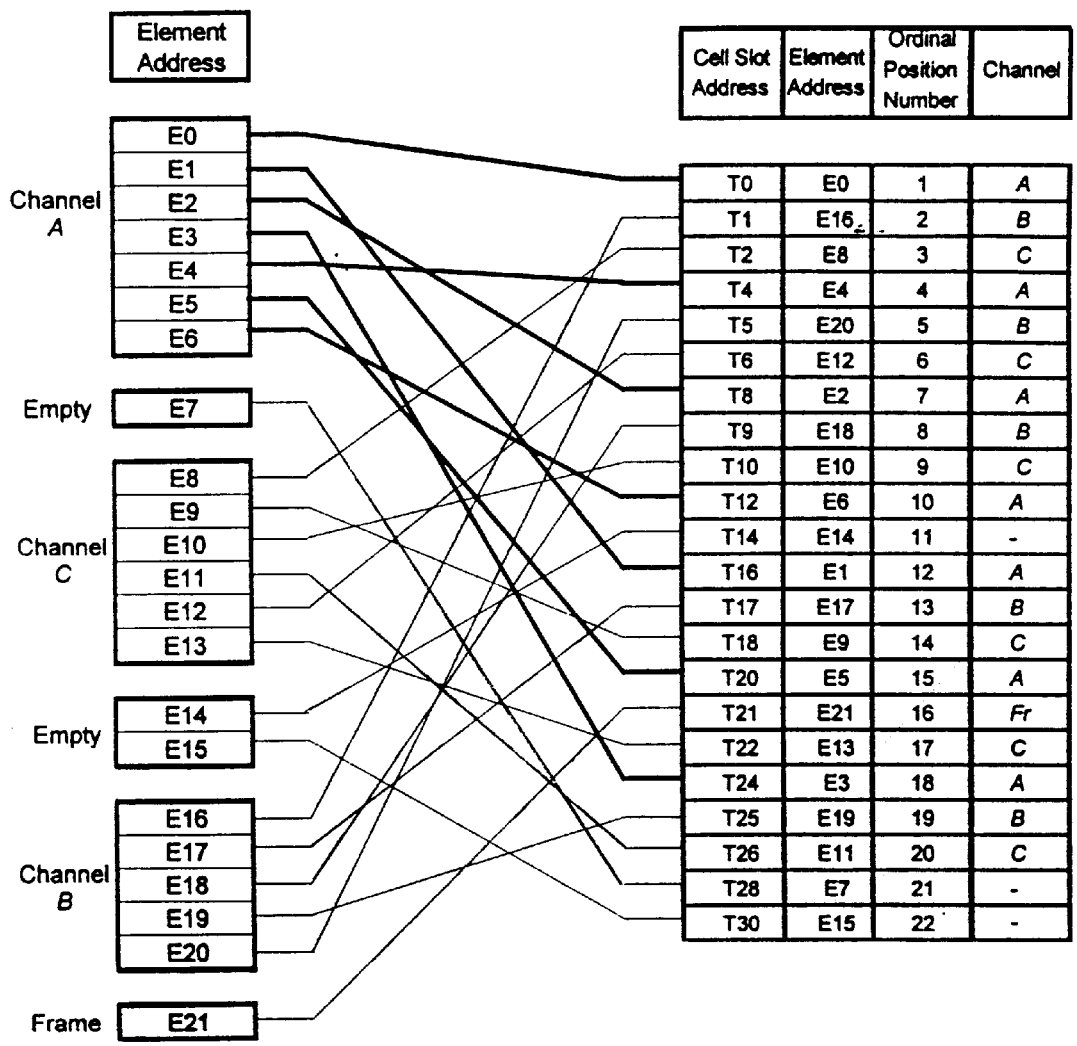
FIG. 5d illustrates the mapping of specific channels to the cell slots of the frame in accordance with the example embodied in the table of FIG. 5b and as illustrated in FIG. 9.

Referring to FIGS. 5a–5c, 6, and 7, a detailed description of a first preferred embodiment of a Cell Slot Selector 12 of the invention is now presented. FIGS. 5a and 5b show tables that illustrate the principles underlying the method and apparatus of the invention. FIG. 5c illustrates the mapping of element addresses used to connote logical assignments of cell slots to particular channels, to cell slot addresses connoting the relative physical position of each of the assigned cell slots within the frame. FIG. 6 is a detailed block diagram of a first preferred embodiment of a Cell Slot Selector 12 apparatus.

Figure 7:
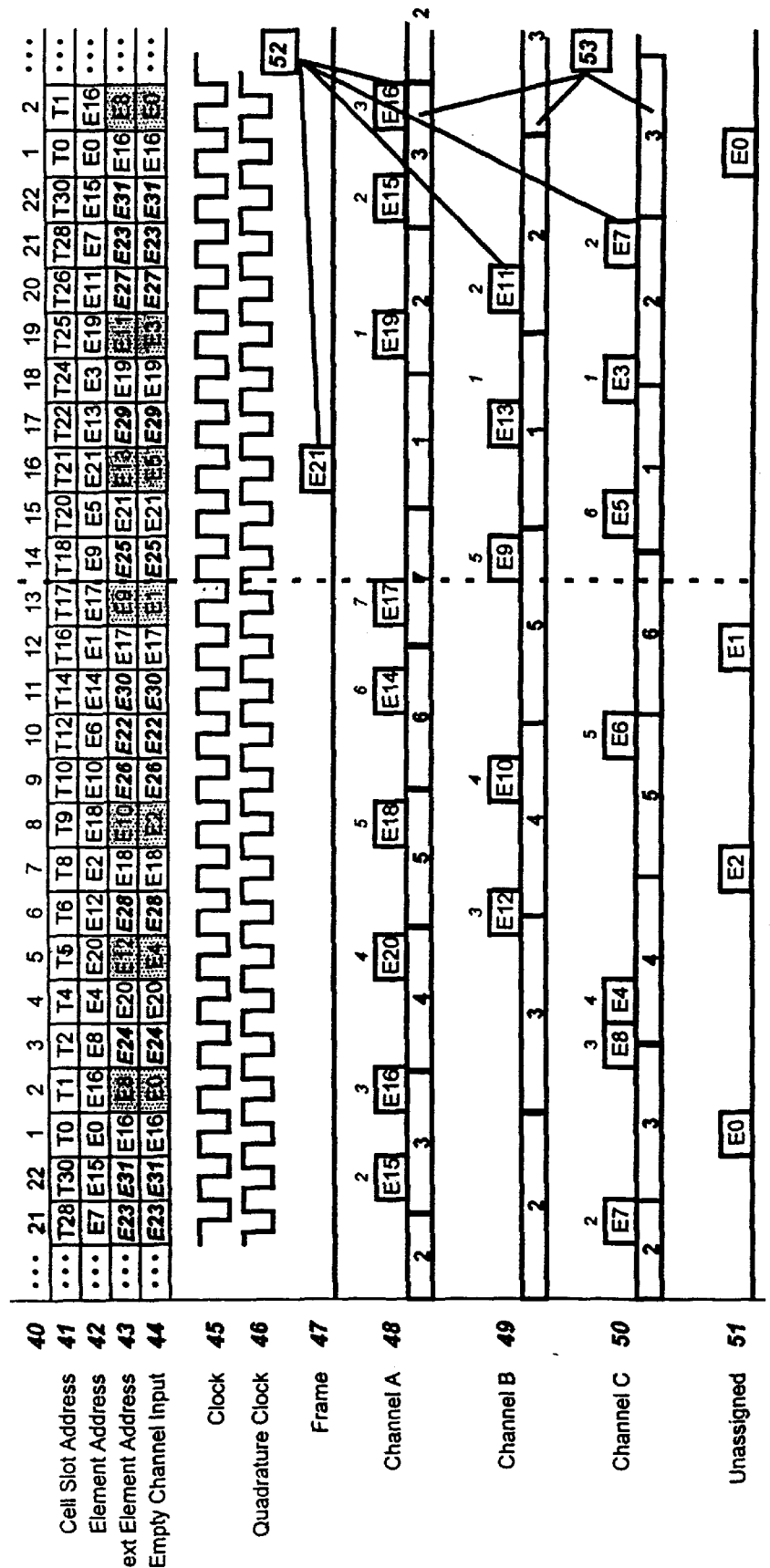
FIG. 7 shows a specific timing example of various signals within the preferred embodiment of the invention.

FIG. 7 illustrates various signals and states of the Cell Slot Selector 12 when operated in accordance with the example embodied in FIGS. 5b and 5c.

a. The Method

The table of FIG. 5a illustrates an example of a system having thirty-two cell slots per frame. The table defines two addresses for each of the set of thirty-two cell slots. One is an element address that facilitates a logical assignment of the set of cell slots in a frame to the specific channels to be established over the system trunk. The second is a cell slot address that connotes the relative physical position within the frame of each of the set of cell slots. The first column of the table contains a binary representation of each of a contiguous range of thirty-two element addresses; the second column contains a decimal representation of the contiguous range of element addresses. The third column of the table contains a decimal representation of a set of cell slot addresses, each of which corresponds on a one-to-one basis with one of the set of element addresses. The element addresses of columns one and two have been transformed into the cell slot addresses of column three. The transformation employed by the first preferred embodiment is symmetric in nature; the identical transform can be applied to the set of cell slot addresses to obtain the set of element addresses as was applied to the set of element addresses to obtain the set of cell slot addresses. The transform maps each element address of the set to a cell slot address the binary representation of which is the mirror image of the binary representation of the associated element address. Observe that the binary representation of each cell slot address (the binary representation of the cell slot addresses is not shown in the table) is the binary address of its associated element address in reverse order. For example, element address E19 has a binary representation E10011. The corresponding cell slot address is T25 the binary representation of which is T11001; 11001 is the reverse order (or mirror image) of 10011. Because this transform is symmetrical (i.e. a given T value translates into the same E value that obtains between that E value and the given T value), the transform facilitates a simple embodiment of these principles in a Cell Slot Selector 12 apparatus.

Because the set of cell slot addresses represents a time-ordered set of values (i.e. they identify each cell in the frame based on its relative position therein), they are reordered in the fourth column in acsending order. The element address which is linked with each cell slot address by the transform is contained in the fifth column. The sixth column of the table of FIG. 5a contains a position number that connotes the ordinal position within the frame of the cell slot that is identified by the cell slot address with which the position number is associated. Thus, logical assignments of cell slots to channels based on element addresses can be mapped using one of any number of transforms to create cell slot addresses which represent relative positions of the cell slots within the frame.

In addition to its symmetric property, another important characteristic of the "mirror image" transform employed in the table of FIG. 5a is that the attained physical distribution of cell slot assignments for a particular channel is substantially uniformly spaced within the frame. Uniform distribution within the frame of cell slots assigned to each channel is desirable because it minimizes the amount of buffering at the sending and receiving nodes of a system. This property is more easily understood in the context of the following discussion.

Assume that there are $F=2^n$ cell slots within a frame that are assigned the set of element addresses $$\{E0, E1, E2, \ldots, E[2^n-1]\}.$$

This set of element addresses is then transformed by the mirror image transform into the set of cell slot addresses $$\{T0, T1, T2, \ldots, T[2^n-1]\}$$

on a one-to-one basis. Any $2^k$ consecutive element addresses, where k<n, can be transformed into a set of uniformly spaced cell slot addresses using the mirror image transform if the range of the element addresses occurs on an element address boundary where $\alpha_E \text{MOD}(2^k)=0$ and $\alpha_E$ is the address of the first element in the range. For example, element addresses E0 and E1 are transformed into cell slot addresses T0 and T16 that are 16 cell slot addresses apart (see FIG. 5a). Likewise, element addresses E6 and E7 are transformed into cell slot addresses T12 and T28 that are again 16 cell slot addresses apart. The set of element addresses $$\{E24, E25, E26, E27, E28, E29, E30, E31\}$$

are transformed into the set of cell slot addresses $$\{T3, T19, T11, T27, T7, T23, T15, T31\}$$

that, when arranged in ascending cell slot order, become $$\{T3, T7, T11, T15, T19, T23, T27, T31\},$$

a set of cell slot addresses that are all four cell slots apart within the frame.

Even when the first element of a range of element addresses does not occur on an $\alpha_E \text{MOD}(2^k)=0$ boundary, the cell slot addresses resulting from application of the mirror image transform are still approximately uniformly spaced. For example, suppose that the range of element addresses to be transformed begins with element address E21, so that the range is $$\{E21, E22, E23, E24, E25, E26, E27, E28\}.$$

According to the table of FIG. 5a, these transform into the set of cell slot addresses $$\{T21, T13, T29, T3, T19, T11, T27, T7\}$$

that, when sorted into ascending order becomes $$\{T3, T7, T11, T13, T19, T21, T27, T29\}.$$

The resulting cell slot addresses are separated by either four cell slots or by two cell slots followed by six cell slots. In practical applications, small jitter buffers will overcome this non-equal spacing.

In general, it is not necessarily the case that the frame length will always be an integer power of two. The method embodied in the table of FIG. 5a can still be made to apply to these cases. Suppose that the desired frame length is F. A virtual frame length N can then be defined to be the smallest integer power of two that is greater than or equal to F. In other words $N=2^n$ where $$n=1+\text{INT}(\log_2(F-1)).$$

FIG. 5b shows a table which illustrates the use of a virtual frame for a system which defines a frame comprising twenty-two cell slots. From the equation above, a virtual frame of thirty-two cell slots should be employed. Thus, the same values are obtained for the virtual frame represented by the table of FIG. 5b and the thirty-two cell slot frame of FIG. 5a. The difference in the two tables is that ten of the element and cell slot addresses correspond to cell slots which are not extant within the real frame of twenty-two cell slots. The element and cell slot addresses corresponding to nonexistent cell slots are shaded in FIG. 5b. In this case, the association of ascending cell slot addresses with ordinal position numbers is particularly important because the set of cell slot addresses is no longer contiguous, but contains gaps where cell slot addresses transformed from nonexistent element addresses would otherwise be; the set of position numbers is contiguous and represents the ordinal positions of only cell slots that exist within the real frame. FIG. 5c illustrates a mapping of channels to cell slots that can result from the example of the method in FIG. 5b.

b. The Apparatus

As previously discussed, a Cell Slot Selector 12 employed in the send context of FIG. 3a must, in real time, fill cell slots of a frame with a cell from the appropriate data source(s) (i.e. the data source(s) constrained to transmit over the channels to which those cell slots have been assigned). In the receive context of FIG. 3b, Cell Slot Selector 12 must extract a cell in real time from each cell slot of a frame and deliver it to the appropriate destination(s) (i.e. the destination(s) constrained to receive data over the channel to which that cell slot has been assigned). In prior art systems, this is a relatively easy task because the assignment of cell slots to channels is typically fixed by convention and not subject to change during real-time system operation. This task is more difficult to implement when the assignment of cell slots to channels can be altered in real time and independent of any particular convention. A Cell Slot Selector 12 in the latter context must be able to recognize in real time to which channel the cell slot to be immediately filled or sampled (i.e. the current cell slot) is assigned and to activate the appropriate Selector Line 19 to effectuate the transfer of a cell from the appropriate source(s) to the trunk or from the trunk to the appropriate destination(s) before the current cell slot has passed by.

To implement the method of the invention and to provide the flexibility of real time programming of channel assignments, Cell Slot Selector 12 must have a means by which it keeps track of the current cell slot in the frame and a means by which it discerns in a timely manner to which channel the current cell slot of the frame has been assigned by the method of the invention. Because the method of the invention results in a set of cell slot addresses that defines each cell slot's relative physical position in the frame, and because the time slots of the frame must be filled or sampled in this time-ordered sequence, Cell Slot Selector 12 can keep track of the current cell slot by sequentially generating the cell slot addresses identifying each of the cell slots in the time-ordered sequence. A first preferred embodiment of a Cell Slot Selector 12 that implements the method of the invention is illustrated in FIG. 6. The embodiment of FIG. 6 is essentially a sequential circuit centered around Cell Slot Counter 30, the output of which embodies cell slot addresses.

As can be seen from the table of FIG. 5a, when the number of cell slots per frame F is equal to some number $2^n$ (e.g. F=32), the set of cell slot addresses produced by the transformation of the method ranges contiguously over the set of F cell slots (i.e. from T0 through T31). Thus, Cell Slot Counter 30 can be reset to some initial value by Frame Reset 20 at the beginning of each frame and then clocked at the trunk transmission rate by Clock Signal 25 to output each cell slot address in the set, thereby identifying as current each cell slot in the order in which it physically appears in the frame.

As can be seen from the table of FIG. 5b, however, when the desired number of cell slots in a frame F is not equal to some number $2^n$ (e.g. F=22, which is less than N=32), the set of cell slot addresses which result from the method of the invention will not range contiguously. By implementing a virtual frame of thirty-two cell slots in accordance with the method, ten element addresses (i.e. E22–E31) are defined which represent cell slots that do not exist in the real frame of twenty-two cell slots. After the set of element addresses for the virtual frame is transformed to the set of virtual frame cell slot addresses, and after those virtual frame cell slot addresses which were transformed from nonexistent element addresses are eliminated from the real set of cell slot addresses, gaps will exist within the range of cell slot addresses. Thus, Cell Slot Selector 12 must have a look-ahead mechanism by which it anticipates when the next state of Cell Slot Counter 30 represents a cell slot address which does not exist and by which it forces Cell Slot Counter 30 to skip over that nonexistent cell slot address.

As previously discussed, the method of the present invention first involves the step of logically assigning cell slots to channels by element addresses. If the cell slots are assigned to channels as contiguous blocks of element addresses, an apparatus of the present invention can determine to which channel (if any) the current cell slot is assigned by determining into which contiguous range of element addresses the element address identifying the current cell slot falls. The subset of nonexistent virtual frame element addresses will typically be a contiguous block, thus permitting a determination of whether the next state of the counter will identify as current, a cell slot the element address for which falls within the nonexistent range. Element addresses that delimit these ranges can be stored in the apparatus for comparison to the element address identifying the current cell slot. If the contiguous ranges of element addresses that are assigned to particular channels are also contiguous with one another (i.e. no unassigned element addresses separate contiguous blocks of assigned element addresses), then only one element address need be stored to delimit each contiguous range of assigned element addresses.

Because the apparatus will sequence itself based on cell slot addresses, however, the apparatus must "know" the inverse transform relationship between the set of cell slot addresses or position numbers and the set of element addresses. The challenge of designing such an apparatus is to minimize the amount of information which must be provided to the apparatus to effect the transfer of cells to and from the trunk based on the current set of cell slot to channel assignments.

As previously discussed, one of the advantages of the mirror image transform implemented in the first embodiment of the method of the invention is that it is symmetric; the same transform that was used to transform the set of element addresses to create the set of cell slot addresses can be applied to the cell slot addresses to get back to their respective element addresses. In accordance with the mirror image transform, the cell slot addresses generated by Cell Slot Counter 30 can be easily transformed back to their respective element addresses simply by arranging the n stages of the counter so that the least significant bit (designated as Stage 1, 31 in FIG. 6) is at the left end of the counter and thus occupies the position of the most significant bit, while the most significant stage n of the counter occupies the position of the least significant bit, when represented as a horizontal series of stages: thus the output of the counter has been inverted so that the cell slot addresses output by the counter are presented as element addresses for comparison purposes.

The inverted output of Cell Slot Counter 30 is connected through a bus arrangement to a series of n-bit comparator/storage circuits, each comprising an n-bit storage portion for storing an element address which delimits one end of a range of contiguous element addresses, and an n-bit comparator portion for performing a bit-by-bit comparison between the inverted cell slot address (i.e. element address) output from Cell Slot Counter 30 and the element address stored in the storage portion as a range delimiter. A more detailed discussion of the comparator/store circuit will be presented later in conjunction with FIGS. 8a–8c.

Empty Channel Comparator/Store 32 stores the highest-numbered element address that exists for the set of F real cell slots within the frame for a given system, thereby delimiting the range of nonexistent or virtual element addresses. Thus, for the example of the table of FIG. 5b, E21 (i.e. 10011) would be stored in Empty Channel Comparator/Store 32 because E22 through E31 are nonexistent element addresses that identify cell slots which are only part of the virtual frame. Frame Channel Comparator/Store 33 has stored within it the highest-numbered element address of the set of F element addresses not assigned to the Frame Channel. Assuming that, for the example embodied in the table of FIG. 5b, the cell slot identified by element address E21 has been assigned to the Frame Channel, E21 (i.e. 10010) would therefore be stored in Frame Channel Comparator/Store 33. Those of skill in the art will recognize that the Frame Channel Comparator/Store 33 could be located anywhere in the series, but that if it is located anywhere other than at either end, it will essentially limit the maximum range of contiguous element addresses available for assignment to any one channel.

Multiplexed Channel Comparator/Stores 34 each contain the highest-numbered element address which is not assigned to the one of m multiplex channels to which each is dedicated. Assuming for the example embodied in the table of FIG. 5b that the seven of twenty-two cell slots logically identified by the contiguous range of element addresses E14–E20 have been assigned to Channel A, Channel Comparator/Store 34a, which is dedicated to Channel A, would therefore have E13 (i.e. 10010) stored within it. Also assuming that the five of twenty-two cell slots logically identified by the contiguous range of element addresses E9–E13 have been assigned to Channel B, Channel Comparator/Store 34b, which is dedicated to Channel B, would therefore have E8 (i.e. 01000) stored in its storage portion. Further, assuming that the six out of twenty-two cell slots identified by the contiguous range of element addresses E3–E8 in the table of FIG. 5b have been assigned to Channel C, Channel Comparator/Store 34c (not shown) would therefore have E2 (i.e. 00010) stored within its storage portion. Finally, assuming that the cell slots identified by the element addresses E0–E2 are currently unassigned, the remaining Channel Comparator/Stores 34d–34m-1 would have E0 (i.e. 00000) stored within their storage portions.

Each Comparator Output 35 of each Multiplexed Channel Comparator/Store 34 is connected to a two-input AND gate 36a, 36b, . . . , 36n1 and 36m. The other input of each AND gate 36a, 36b, . . . , and 36m1 is an inverted version of the Comparator Output 35 of the predecessor Multiplexed Channel Comparator/Store 34 (or in the case of the AND gate 36a, of the Frame Channel Comparator/Store 33). Because Channel m represents the channel where the lower limit element address is inherently 0 and the upper limit is the element address stored in Multiplexed Channel Comparator/Store 34m-1 (which is dedicated to Channel m-1), Channel m does not require a Channel Comparator/Store. A Selector Line 19 is created for Channel m simply by inverting the output of Multiplexed Channel Comparator/Store 34m-1. Thus, the Selector Lines 19 signify that for each multiplex channel, the element address denoted by the reverse order of the Cell Slot Counter 30 lies within the range of two element addresses stored in a Multiplexed Channel Comparator/Store 34 and its predecessor. For the Frame Channel Comparator/Store 33, it signifies that the element address is greater than the element address value stored therein; it is greater than the upper limit of the range of element addresses currently assigned to Channel A.

As previously discussed, in those cases where the number of cell slots per frame F is less than $N=2^n$, Cell Slot Selector 12 must be able to look ahead to the next value of the cell slot counter to determine whether it represents a cell slot address for a nonexistent (i.e. virtual cell slot). Because of its contiguous nature, the set of cell slot addresses for a virtual frame of length $N=2^n$ contains addresses which alternate between even and odd values. By the nature of the mirror image transform, all of the odd-numbered cell slot addresses were transformed from element addresses for which the most significant bit is a one (i.e. element address values that are greater than or equal to N/2). Because the nonexistent element addresses must by definition always fall within the range of values that are greater than or equal to N/2, any nonexistent cell slot addresses to be skipped must be odd.

One possible embodiment of the invention (not shown) that can calculate the next element address state from the current one would include an n-bit adder that adds one to the current state of the Cell Slot Counter 30 and then inputs in reverse order the output of the adder into Empty Channel Comparator/Store 32. Because Empty Channel Comparator/Store 32 has the highest existing element address stored within it, if the calculated next state of the counter yields an element address value greater than that stored value, the comparator output of Empty Channel Comparator/Store 32 would become active TRUE. This information can then be fed back to the counter to cause it to skip over the next state. Such an approach could be implemented by one skilled in the art of digital circuitry. There is a much simpler approach to accomplishing the desired result, however, and that approach is incorporated within the preferred embodiment of the invention as illustrated in FIG. 6.

If the current state of Cell Slot Counter 30 is an even-numbered value (i.e. its least significant bit (LSB) is a zero), then inverting the output of its LSB will always correctly indicate the counter's next state; inverting the LSB of the counter is equivalent to adding one to its current state. If the current state of Cell Slot Counter 30 is odd, inverting the LSB will not correctly predict the next state because adding one to an odd state not only inverts the LSB, but also generates a carry bit. Because nonexistent cell slot addresses are always odd, however, the correct prediction of the next counter state is only necessary when the counter's current state is even. Thus, the preferred embodiment successfully implements the look-ahead function simply by providing the output from 30 directly as an input to Empty Channel Comparator/Store 32, except that the LSB of the counter output is inverted.

When the next state of the counter, as predicted by inversion of the LSB, will produce an odd element address that exceeds the highest element address value that exists in the real frame, the Comparator Output 35 of Empty Channel Comparator/Store 32, which is connected to the Set input of Flipflop 37, becomes active TRUE. This sets Flipflop 37 which inhibits AND 38a and enables AND 38b, thereby causing Cell Slot Counter 30 to be clocked by Clock Signal 25 through its second LSB (i.e. Stage 2) while holding the LSB at a binary zero. This causes Cell Slot Counter 30 to skip over the nonexistent cell slot address. After skipping the nonexistent state, the output of Flipflop 37 is clocked back to a binary zero by Quadrature Clock 26 and once again, Cell Slot Counter 30 is clocked through its LSB (i.e. Stage 1).

Based on the table shown in FIG. 5b and the channel assignments defined above, FIG. 7 illustrates the waveforms that occur within a Cell Slot Selector 12 where there are 22 element addresses and where n=5 (i.e. a virtual frame length N=32). The line in the figure labeled Cell Slot Position 40 is the Position Number of each cell slot of a 22-element frame aligned so that position 1 lines up with cell slot address T0. The rightmost column of the table in FIG. 5b shows cell slot Position Numbers. The next line, Cell Slot Address 41, shows the cell slot addresses that correspond to each cell slot position. Cell slot addresses fall within the range $$\{T0, T1, \ldots, T31\}.$$

As shown in the table of FIG. 5b, cell slot addresses $$\{T3, T7, T11, T13, T15, T19, T23, T29, T31\}$$

are not included in the real frame. The next line in FIG. 7, Element Address 42, shows the element addresses that correspond to each cell slot address included in the real frame. Note that the element addresses shown all fall within the range $$\{E0, E1, \ldots, E21\},$$

which comprises the first 22 contiguous element addresses shown in the table of FIG. 5b.

The next line of FIG. 7, Next Element Address 43 shows the element address that will be generated if the current state of the Cell Slot Counter 30 is advanced by one. For example, if the cell slot address is T8, the corresponding element address is E2; the next cell slot address will be T9 with a corresponding element address E18. If the current cell slot address is T2 with its corresponding element address E8, the next state of the cell slot counter will be a virtual frame cell slot address of T3 and a corresponding virtual frame element address E24. E24 is, of course, outside the range of permissable element addresses. The line labeled Empty Channel Input 44 illustrates the address value that is actually input to Empty Channel Comparator/Store 32. Note that whenever the current state of Cell Slot Counter 30 represents an odd cell slot address, the Empty Channel Input 44 value is an incorrect prediction of the next state as correctly indicated by Next Element Address 43; these cases are shaded in FIG. 7. Note, however, that in each one of the incorrectly predicted cases the Cell Slot Selector 12 will not make an incorrect decision by failing to skip a state that must be skipped. Also note that whenever the value of the Next Element Address 43 indicates that the next state should be skipped (i.e. that the next element address is greater than E21), the value of the Empty Channel Input 44 correctly predicts this address and thus causes the Cell Slot Selector 12 to skip that state by effectively incrementing Cell Slot Counter 30 by two counts; these cases are indicated in FIG. 7 in boldface type.

The signal Frame 47 of FIG. 7 illustrates the location of the frame cell slot within the frame of the multiplex stream. Signals Channel A 48, Channel B 49 and Channel C 50 provide two levels of information. Per the channel assignments discussed above, on the top level they indicate the location within the frame of each channel's assigned cell slots through Cell Slot Selector Pulses 52 as they might appear on Selector Lines 19 of Cell Slot Selector 12. Each cell slot's associated element address is indicated within its corresponding Cell Slot Selector Pulse 52. On the bottom level, equal periods of time 53 are shown which illustrate a possible sequence of cells to be sent from a data source over the multiplexed channels A, B, and C. Each sequence represents the output of a buffer coupled to a serial data source that is clocked at a uniform rate equal to the number of cell slots assigned to each respective channel per total frame period. Each cell of the sequence, produced for transmission over a particular channel during a single frame period, has been numbered in accordance with its position in the sequence.

Each of the Cell Slot Selector Pulses 52 for a particular channel is also marked with a sequence number corresponding to that cell in the sequence having the same sequence number and which is to be transmitted within the cell slot represented by that correspondingly numbered selector pulse. For example, as illustrated by the signal Channel A 48, the cell marked with sequence number 3 is produced by a source assigned to transmit over Channel A and will be inserted into the multiplex data stream in the cell slot of Channel A which is marked with the same sequence number 3 and which is identified by element address E16. The positioning of these cell periods is defined such that the beginning of each cell period must precede the onset of its correspondingly numbered cell slot period by a minimum of one half of a period of Clock Signal 25 (shown in FIG. 7 as Clock 44). This one half of a cell slot period should allow for sufficient settling of the cell data at the output of the buffer, prior to transfer of the cell data to the trunk, if the cells are comprised of single bits or information symbols, or if the cells are composed of a mulitplicity of bits or symbols which are all made available in parallel at the output of the buffer.

The signal Unassigned Channel 51 indicates the positions of those cell slots of the frame which have yet to be assigned to a specific channel. Of course, Cell Slot Selector 12 would not typically generate Selector Pulses 52 for these cell slots until they are assigned to a channel.

Thus for each channel, the numbered cell periods can be compared with their correspondingly numbered cell slots to determine how much buffer delay of the cells is required. For example, Channel A 48 in FIG. 7 shows the previously defined seven-element-per-frame example of a multiplexed channel with element addresses E14 through E20 assigned to it. Starting with the first element to occur after the E21 pulse of Frame 47, the element addresses are $$\{E19, E15, E16, E20, E18, E14, E17\}$$

corresponding to cell slot addresses $$\{T25, T30, T1, T5, T9, T14, T17\}.$$

The numbered cells produced for transmission over Channel A 48 are represented as the output of a buffer attached to a serial data source that is clocked at a uniform rate equal to seven cell slots per multiplexed frame period. For Channel A, the cell and cell slot marked with sequence number 7 dictate the relative spacing of the other cells with respect to their cell slots. To ensure a stable output. cell 7 is constrained to precede by one-half of a cell slot period its corresponding Selector Pulse 52 identified by sequence number 7. With this alignment, the longest time between the start of a cell period and the onset of its corresponding cell slot Selector Pulse 52 occurs for the cell and cell slot marked by sequence number 1. The ordinal position of cell slot 7 within the entire frame is 13, while the ordinal position of cell slot 1 is 19. Thus, six cell slot periods exist between the rising edges of the two Selector Pulses 52 corresponding to the two cell slots. The nominal spacing between cell slots is equal to the total number of cell slots per frame F divided by the number of cells produced per frame for transmission over Channel A.

In this example, the nominal spacing is therefore 22/7=3.14 cell slot periods. The added delay due to the non-equal spacing of the seven cell slots assigned to Channel A is approximately 6.00−3.14=2.86 cell slot periods. Added to this value is the assumed 0.5 cell slot periods for circuit settling; the result is an overall delay of 3.36 cell slot periods. This is equivalent to 1.07 periods of the uniformly spaced input cells. Thus, the requisite input buffer delay is only slightly larger than one cell period for Channel A in this case, necessitating a buffer of only two cells in length.

Channel B 49 shows the five-cell per frame channel that has assigned to it the next five element addresses below those of Channel A 48. In a manner equivalent to the Channel A 48 case, the element address values are in the range E9 to E13 and their order of generation after the frame cell is

{E13, E11, E12, E10, E9} corresponding to cell slot addresses

{T22, T26, T6, T10, T18□.

For Channel B, the cell and cell slot identified by sequence number 2 dictates the requisite buffer delay. The maximum delay from the beginning of a cell period and the onset of its corresponding cell slot period occurs for the cell and cell slot identified by sequence number 3. The ordinal position within the frame of the cell slot identified by sequence number 2 is 20, and that for the cell slot identified by sequence number 3 is 6. Thus, a spacing of 8 cell slots exists between the beginning of the two cell slot periods. The nominal spacing between the five cell slot s of Channel B is 22/5=4.4 cell slot periods, rendering the added delay due to the non-equal spacing to be 8.0−4.4+0.5=4.1 cell slot periods. The requisite delay is therefore only 0.93 periods of the uniformly spaced input cells. Therefore, the buffer at the input node to Channel B has to be just one cell in length.

Channel C 50 shows the six-cell per frame channel to which the next lower set of contiguous element addresses for this example are assigned, E4 to E8, comprising the set

{E3, E7, E8, E4, E6, E5} which correspond to the set of cell slot addresses

{T18, T21, T2, T4, T10, T20}.

For Channel C, the timing between the cell and cell slot identified by sequence number 4 dictates the requisite buffer delay. The relative positions of the cell and cell slot identified by sequence number 6 are the greatest in time for Channel C. The nominal spacing between the cell slots assigned to Channel C is 22/6=3.67 cell slot periods. The number of cell slot periods between the cell slots identified by sequence numbers 4 and 6 is 15−4=11. In this case, however, there are two nominal periods separating the constraining cell slots identified by the sequence numbers 4 and 6. Thus, the requisite added delay is 11−2·3.67=3.67 periods. Including the 0.5 cell slot period settling time, the delay is the equivalent of 1.14 periods of the uniformly spaced input cells. Therefore, the buffer at the node of Chanel C has to be only two cells in length.

This example illustrate that the buffer delay required to overcome the non-uniform spacing of the slots is small at the periodic rate of the input cells.

Although the above example, including Channel A 48, Channel B 49 and Channel C 50 shown in FIG. 7 have been described in terms of multiplexing cells from input sources, the delay requirements for delivering uniformly spaced cells to an output data sink are essentially the same. The uniformly spaced cells need be delayed by a single cell slot period plus any settling time required by the circuitry employed in the embodiment.

FIGS. 8a, 8b and 8c illustrate an embodiment of an Empty Channel Comparator/Store 32, a Frame Channel Comparator/Store 33 or a Multiplexed Channel Comparator/Store 34 of FIG. 6, all of which are identical in structure. FIG. 8a shows a series of Comparators 60 $c_k$ corresponding to each bit of a cell slot/ element address. It also shows a series of Storage Register Elements 61 $S_k$, each of which are coupled to one of the Comparators 60. Each Storage Register Element 61 represents a single bit of a storage register for storing delimiting element addresses as described above.

FIG. 8b illustrates the inputs and outputs of a Comparator 60. The input for receiving an element address bit from the Cell Slot Counter 30 is designated by way of $e_k$. The stored bit of a delimiting element address is input from the storage register to the Comparator 60 by way of $s_k$. Except for the most significant comparator block $c_k$ where k=n, and the least significant comparator block $c_k$ where k=1, inputs $G_k$ and $L_k$ of the other comparator blocks in the series are coupled to the outputs $G_{k+1}$ and $L_{k+1}$ of their respective predecessor comparator blocks. For the comparator block $c_k$ where k=n, the inputs $G_k$ and $L_k$ are tied to a binary zero; for the the least significant comparator block $c_k$ where k=1, only output $G_{k+1}$ has relevance as it corresponds to Comparator Outputs 35 of FIG. 6.

FIG. 8c is a table that shows the logic necessary for proper operation of a comparator/store of the present invention. Operation of a Comparator 60 depends on the state of its four inputs, $G_{k+1}$, $L_{k+1}$, $e_k$ and $s_k$ as shown in the table. As can be seen from the table, the outputs $G_k$ and $L_k$ of each stage in the series can be influenced by its comparison of the values on its inputs $e_k$ and $S_k$ provided that each of its more significant predecessor stages provides binary zeros on its $G_{k+1}$ and $L_{k+1}$ outputs. Put another way, the first comparator stage in the series, starting from the most significant stage, to detect a "greater than" or "less than" comparison between the values on its inputs $G_k$ and $L_k$ will dictate the result of the comparison; its $G_{k+1}$ and $L_{k+1}$ output values will be propagated through the remaining stages of the series regardless of the comparative nature of their input values. One of ordinary skill in the art of logic circuit design is capable of designing the circuitry to implement the function described by the table of FIG. 8c. For example, the functions of Comparator 60 can be implemented by a standard integrated circuit such as a 74HC85 or equivalent.

If both $G_j$ and $L_j$ are ever simultaneously a binary one at any stage, an error condition occurs and no sensible output can be determined. The table of FIG. 8c illustrates these illegal states by shading them. It should be noted that the designation of the most significant comparator stage in the series of FIG. 8a (i.e. the leftmost stage) as the nth stage is made with respect to an element address. Thus, the result is inverted with respect to the naming of the Cell Slot Counter 30 stages, which also adopts the nth stage as the most significant stage but with respect to cell slot addresses.

Second Preferred Embodiment

Figure 9:
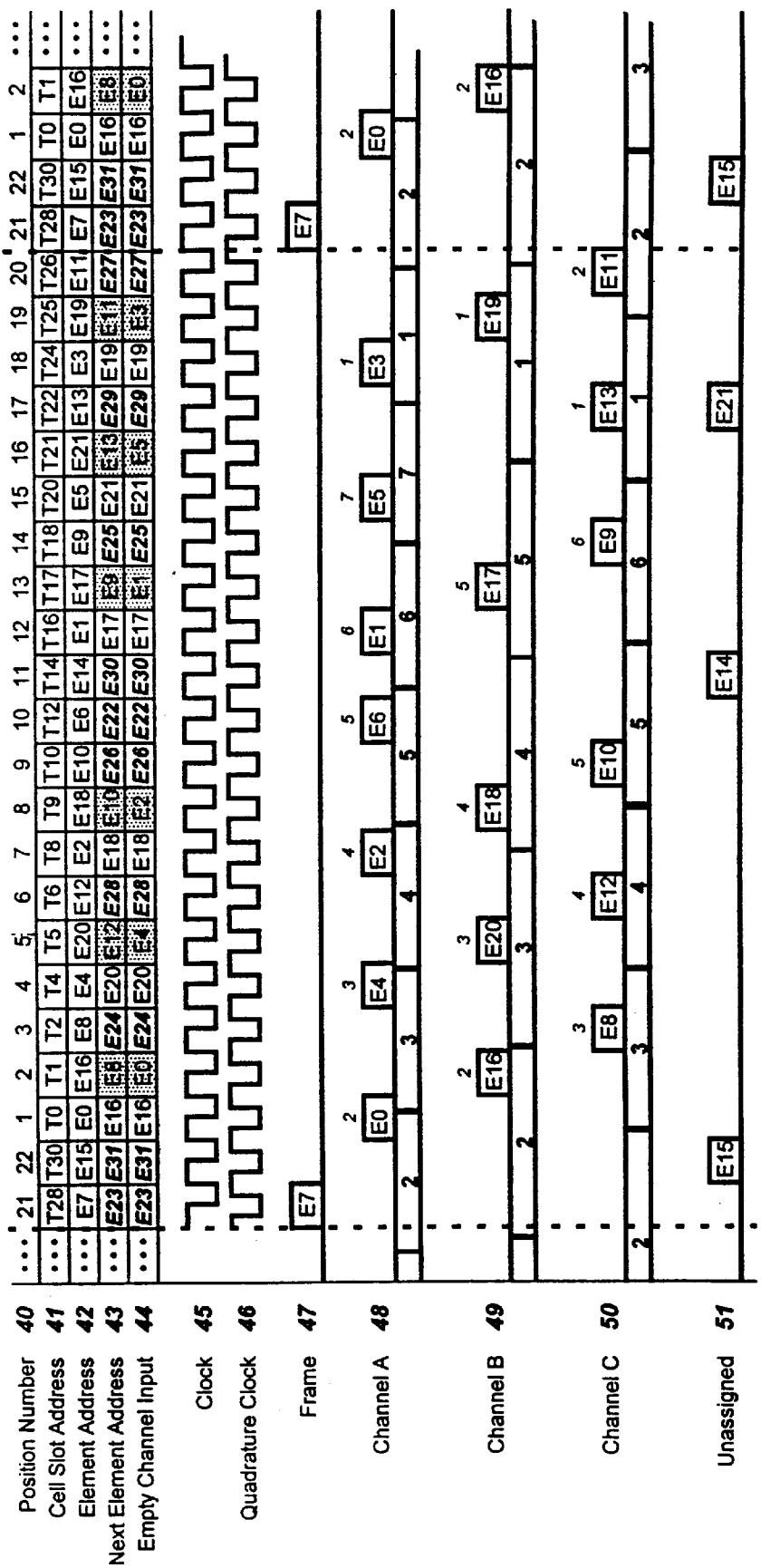
FIG. 9 shows another specific timing example of various signals within an alternate embodiment of the invention.

One preferred alternate embodiment of the invention expands the capability of the implementation shown in FIG. 6. In this second preferred embodiment, each the Multiplexed Channel Comparator/Stores 34 is duplicated such that both an upper and lower element address delimiter can be defined for each channel. This embodiment, although more complex from a circuit standpoint, eliminates the constraint placed on the first embodiment that the assigned contiguous blocks of element addresses also be contiguous with one another. By permitting intervening unassigned element addresses between the contiguous blocks of assigned element addresses, more equally spaced cell slot assignments can be realized. FIG. 9 illustrates this concept as applied to the same channel configuration as previously illustrated in FIG. 7.

Thus, Channel A 48 in FIG. 9 illustrates Channel A once again to have seven of the twent-two cell slots allocated to it so that it may transmit seven cells of data per frame. In the example of FIG. 9, however, Channel A has been assigned element addresses E0 through E6 (in the example of FIG. 7, Channel A was assigned element addresses E14 through E20). They comprise the set of element addresses

{E3, E0, E4, E2, E6, E1, E5} which is transformed to the set of cell slot addresses

{T24, T0, T4. T8, T12, T16, T20}.

In accordance with the example of FIG. 7, the maximum delay is calculated to be 0.75 cell periods. This compares with 1.07 cell periods for the FIG. 7 element address assignments. Thus, the new cell slot assignments made possible by the additional Multiplexed Channel Comparator/Stores 34 shortens the requisite buffer to one cell in length.

In a like manner, Channel B 49 in FIG. 9 shows the same five-cell-per-frame channel of FIG. 7 except that it is now assigned element addresses E16 through E20. They comprise the set of element addresses

{E19, E16, E20, E18, E17} which is transformed to the set of cell slot addresses

{T5, T9, T17, T25, T1}.

The maximum delay can be calculated as previously discussed and is again found to be 0.75 cell periods. The corresponding FIG. 7 delay is 0.93 low speed cell slot periods.

Channel C 50 in FIG. 9 shows the same six-cell-per-fame channel of FIG. 7 except that it has now been assigned element addresses E8 through E13. They comprise the set of element addresses

{E13, E11, E8, E12, E10, E9} which is transformed to the set of cell slot addresses

{T22, T26, T2, T6, T10, T18}.

The maximum delay is even a smaller at 0.50 cell periods, compared to 1.14 cell periods in the FIG. 7 case. Again, the requisite buffer size has been shortened by one cell in length.

The Frame Channel h a s been assigned element address E7 which i s transformed to cell slot address T21. The position of frame cells can be arbitrarily assigned. In general, maximum flexibility is achieved by assigning lower element addresses to currently existing channels and assigning the remaining element addresses for assignment to new channels as they are added . This approach is further articulated in the description of an additional preferred embodiment below.

The difference in cell slot allocation strategy dictated by the physical attributes of the FIG. 7 embodiment and the FIG. 9 embodiment is that in the embodiment of FIG. 7, element addresses must be assigned so that the lower boundary of a block of contiguous element addresses assigned to one channel always forms the upper boundary of another (i.e. the assigned blocks are contiguous with one another). In the embodiment FIG. 9, however, the ability to store both an upper and lower bound element address for each channel permits assignments to be made on a power of two element address boundary.

If there are $g_h$ cells in a frame for channel h, the value of $$n_h = 1 + INT(\log_2(g_n - 1))$$

is first determined. The desired lower boundary element address must be divisible by $2^{n_h}$. In otherwords, the range of the element addresses must start with a value of $e_{hl}$ such that $e_{hl} MOD(2^{n_h}) = 0$.

Another important benefit of being able to designate both upper and lower boundary limits of a contiguous range of element addresses assigned to a channel is that under certain conditions, the corresponding cell slots are equally spaced in time. This will be the case where the number of element addresses assigned to a given channel is an integer power of two and that integer power of two is a divisor of the total, length F of the multiplexed channel.

For example, in the table of FIG. 5b, suppose that it is desired to allocate a two cell per frame channel. Choosing any even numbered element address and its next higher element address results in cell slot assignments that are 11 cell slots apart in the physically transmitted frame. This is true because the specified number of cell slots per frame F is 22 and that number is divisible by 2. For example, if a channel is assigned the set of element addresses {E0, E1}, the corresponding set of cell slot addresses achieved through application of the mirror image transform is {T0, T16}. These cell slot addresses further map to ordinal positions 1 and 12 in the frame, which are 11 cell slots apart.

Third Preferred Embodiment

Figures 10, 11:
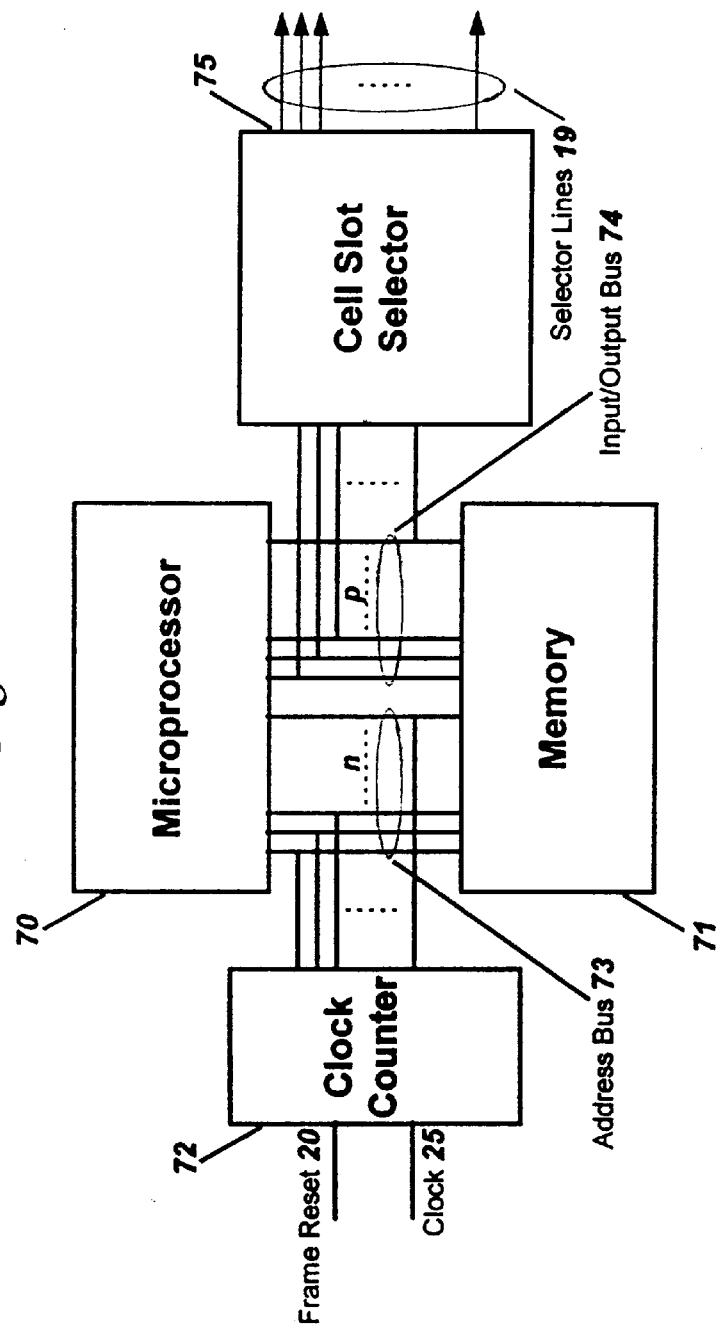
FIG. 10 is a block diagram of an alternate preferred embodiment of the invention involving microprocessor technology.
FIG. 11 illustrates the addressing techniques used in a microprocessor-based alternate embodiment of the invention.

Another alternate preferred embodiment of the invention is shown in FIG. 10 wherein the method of the present invention described above is implemented by a general purpose microprocessor in conjunction with memory and appropriate buses. Microprocessor 70 is programmed to perform the following functions: 1) assigning element addresses to channels as dictated by the transmission rate per frame for each channel to be established; 2) transforming the assigned element addresses to cell slot addresses in accordance with whatever transform the user specifies; 3) further mapping the assigned cell slot addresses to ordinal position numbers representing each cell slot's ordered position within the frame; and 4) loading into Memory 71 the resulting assignment of channels to cell slots based on their ordinal positions within the frame. The assignment information generated by Microprocessor 70 is preferably stored in Memory 71 by storing the channel number of the channel to which a particular cell slot is assigned in a memory location of Memory 71, the address for which is associated with the ordinal position number of the particular cell slot. Because the channel assignments are stored as a function of ordinal position number, element and cell slot addresses are not necessarily stored in Memory 71. Also, the channel assignment information can then be accessed sequentially in the order the cell slots appear in the frame by Clock Counter 72.

As shown in FIG. 10, Microprocessor 70 is connected to Memory 71 through an n-line Address Bus 73 and a p-line Input/Output Bus 74. The n lines of the Address Bus 73 access channel number assignment information for each cell slot ordinal position in a frame comprising up to $2^n$ cell slots. The p lines of the Input/Output Bus 74 allow for the implementation of up to $m \leq 2^P-2$ imbedded multiplexed channels within a frame along with a channel reserved for frame pulse(s) and for cell slots that are not currently assigned to either an information channel or to a frame channel.

During operation of this embodiment, Clock Counter 72 causes consecutive memory addresses, each of which also represents consecutive ordinal cell slot positions, to appear on Address Bus 73. The clocking operation is similar to that of FIG. 6. Clock Signal 25 causes the Clock Counter 72 to advance one count to reflect the current multiplex cell slot position. Frame Reset Signal 20 resets Clock Counter 72 so that the frame signal cell slot appears at the proper position within a frame. Since the program executed in Microprocessor 70 converts cell slot addresses obtained through the transform process to ordinal cell slot positions, there is no requirement for the state skipping circuitry required by the embodiment shown in FIG. 6. The Clock Counter 72 output proceeds from a count of zero to a count of F, the total number of cell slots in the multiplex frame.

Clock Counter 72 addresses Memory 71 to cause the channel numbers stored in each location to appear on Input/Output Bus 74. Cell Slot Selector 75 is comprised of conventional logic circuitry necessary to convert Input/Output Bus 74 channel numbers into selector line signals or whatever other form convenient to interface with signal sources and sinks. Because Microprocessor 70 and Clock Counter 72 share the same bus, one of ordinary skill in the art could implement circuitry (not shown) to assure that conflicts between the two do not occur.

FIG. 11 shows a table of channel number assignments versus cell slot ordinal position numbers for the example illustrated in FIG. 9 with a few notation changes. Channel A 48 is designated as Channel 1 while Channel B 49 becomes Channel 2 and Channel C 50 becomes Channel 3.

A pseudo-program is illustrated in FIGS. 18*a*, 18*b*, 19*a*, and 19*b* that describes the procedure that would be embodied in a program residing in Microprocessor 70. Those of ordinary skill in the art of programming will be able to write such a program based on this pseudo-program description. The first segment of the program as shown in FIGS. 18*a* and 18*b* embodies a method of assigning channels to power of two boundaries as described above for the second preferred embodiment using two comparators per channel. Of course, the first preferred embodiment of the method requiring only a single delimiting element address per channel could also be easily implemented with even a smaller number of program steps. The second segment as shown in FIGS. 19*a* and 19*b* shows a procedure for loading a memory location corresponding to each each cell slot ordinal position with an assigned channel number.

FIGS. 12*a*, 12*b*, 12*c* and 12*d* are tables useful in explaining the operations embodied in the pseudo-program. All tables are based on the example shown in FIG. 9. FIG. 12*a* is an input table corresponding to the example of FIG. 9. It includes a set of inputs $C_K$ (i.e. channel number) and $S_K$ (i.e. size in number of cell slots). The column labeled K is the relative memory location within the table. This table is not necessarily present as a set of stored values in an actual embodiment, but is included for clarity of discussion.

FIG. 12*b* shows the table of FIG. 12*a* after it has been sorted by program step 1 in descending order on the size column.

Steps 2 through 4 set the lower bound column to N−1 where N is the virtual frame length of the cell slots per frame. The final value is updated by the steps that follow.

Steps 5 and 6 store the lower and upper element address boundaries of the channel with the most cells in the K=1 row of the two rightmost columns of the table. This is shown in the K=1 row of FIG. 12*c* for the example of FIG. 9.

Steps 7 through 31 form a FOR loop that assigns lower and upper element address boundaries for the remaining channels. Step 7 initializes the FOR loop to execute m times. (There are m assigned channels plus a frame channel that is included in the embodiment of channel assignment.)

Steps 8 through 12 compute the value of h, the exponent in the expression $H=2^h$, while step 13 calculates the value of H itself, the smallest power of two number of cells that would support a channel of size $S_{k+1}$. On the first pass through the FOR loop, the size of channel stored at row K=2.

At step 14 the program variable LT is set to H. LT is a test variable that is used to determine the lowest element address boundary that will support channel K+1, the next channel to be assigned. Such a boundary must be an integer multiple of H.

Step 15 sets an error variable ERR to TRUE. The variable will later be set to FALSE if a sequential set of $S_{k+1}$ element addresses are found within unassigned element addresses within the FOR loop that begins at step 16.

Steps 16 through 28 form a FOR loop that executes the search for available space using a J as the count variable. J ranges from 1 through K so that the search occurs on all the channels that have thus far been assigned.

Step 17 determines whether or not the current test value of LT is less than the upper boundary of the $J^{th}$ channel, that is, less than the upper boundary successively for each of the channels already assigned. If it is true, the current channel cannot be the value of LT must be incremented (by a multiple of H) and is accomplished in step 18.

If the test value is greater than the upper boundary, it may be possible to fit the current channel that is a candidate for assignment into the space just above the upper boundary at the next integer multiple of H boundary. Step 19 tests this possibility. It determines whether the value of LT plus the size of the channel is less than or equal to the lower bound. In other words, whether the current channel will fit between the upper boundary of channel on row J and the channel on row J+1 of the table. (Note that the table is re-sorted in ascending lower boundary column order at step 30. This assures proper operation of this portion of the program segment. (Also note that the prestored value of the lower boundary, performed at steps 2 through 4 assure that the segment functions properly for channels yet to be assigned including the last channel.)

Steps 20 and 21 set the lower and upper element address boundaries for the current channel.

Step 22 tests to be certain that the newly assigned upper boundary is less than or equal to F, the virtual frame length. If it is, the current channel can be accommodated and at step 23, the value of ERR is set to false so that the test for ERR at step 29 fails and the error subroutine SUBERR is not called.

Step 25 causes the inside ENDFOR loop to be aborted if a lower and upper boundary for the current channel has been assigned.

As stated above step 29 tests to see if the subroutine SUBERR is to be called. This subroutine is not described herein as it has no bearing on the invention and depends on the needs of a specific application of the invention.

Step 30 sorts the CHANNEL table on the lower boundary column so that the inner FOR loop operates properly.

FIG. 12c shows the table corresponding to the channel assignments of FIG. 9 as it would appear after completion of the program segment.

Those of skill in the art will recognize that there are many ways which can be envisioned to program the microprocessor to determine the upper and lower bound element addresses based on the method of the present invention. These include merely storing channels successively in element address order with or without the sorting operation of step 1. It is also possible to store channel assignments to noncontiguous element address ranges. This latter possibility would cause the table to be enlarged because any channel that does not use a contiguous element address range would appear in more than one row of the resulting table.

The second program segment beginning at step 32 of FIG. 19a determines the channel assignment for each of the F ordinal cell slot positions in the frame. The segment assumes that a table similar to that of FIG. 12c has been prepared, either by running a program segment such as the first segment described above, or by some other means. For example, a table could be prepared manually or through some other process not described herein.

Steps 32 and 33 calculate the value of the virtual frame length N and the exponent n in the formula $N=2^n$.

Steps 34 through 36 initialize the channel number column of FIG. 12d to 0 corresponding to a cell slot to which no channel has yet been assigned.

Step 37 sets a counter variable IP to 0. As shown in FIG. 12d, there are two representations for cell slot position, one that conforms to the figures and discussion previously presented and one that pertains specifically to the hardware embodiment of FIG. 10. The range of ordinal cell slot positions designated by the counter begin at 0 while those shown heretofore begin at 1. The variable IP relates to the counter designation.

Steps 38 through 50 form a FOR loop that computes channel numbers that are assigned to each cell slot by its ordinal position. The range of the FOR loop is $\{1, \ldots, N\}$ so that the loop is executed N times although channels are only assigned, at most, F times within the loop. The loop variable is IT which forms the cell slot address part of the $\{IT, IE\}$ transform pair; IE is the element address.

Step 39 calculates the IT →IE transformation based on the mirror image transform that has been described as a preferred embodiment of the present invention. It should again be noted that the user may select from a myriad of such transforms, and that the method of the present invention does not rely on the preferred embodiment of the method for patentability of the invention.

Step 40 determines if the element address IE that has been calculated falls within the range $\{0, \ldots, F-1\}$. If IE exceeds F, the FOR loop is exited and no channel assignment is made.

The FOR loop steps 41 through 49 determine if the value of IE falls within the range of any channel defined by a table such as the input table shown in FIG. 12c. The FOR loop is incremented m+1 times, which encompasses the number of channels to be assigned plus a channel for the frame. (This statement assumes that there is one row of the input table for each channel. If channels are assigned to non-contiguous element ranges, the loop is incremented a number of times equal to the number of rows in the table.)

For each row of the input table, step 42 determines if IE is greater than or equal to the lower boundary stored in the row corresponding to K. If it is, then step 43 determines if IE is less than the upper limit of the same row. If it is, then the channel number stored on the same row of the input table is entered into position IP of the output table such as that shown in FIG. 12d. This is accomplished at step 44.

Having completed assignment of the channel to the output table, step 45 causes the inner FOR loop to be exited.

Those of skill in the art will recognize that without departing from the intended scope of the present invention, there are many other ways of implementing the embodiment of FIG. 10 and in particular, making use of the channel-number/cell-slot program segment described above. Step 39 could be replaced by one of many possible transforms. Alternatively, a transform could clump ranges of element address values into contiguous ordinal cell slot positions, rather than attempt to distribute them evenly throughout the frame. Transform tables could be based on virtual frame lengths that are not a power of two. They could be based on a power of 3, for example.

Fourth Preferred Embodiment

The table shown in FIG. 13a illustrates a fourth embodiment of the invention. This embodiment is suited for applying the method of the invention to multiplex the cells being transmitted over the embedded channels of two or more lower speed time division multiplex data streams onto a single higher speed time division multiplex trunk. The lower speed incoming trunks can each have a plurality of embedded channels that have been allocated cell slots comprising the lower speed frames for each of the lower speed trunks through the method of the invention as previously described. The method of the invention can then be applied a second time to the incoming lower speed trunks as if they are sources of cell slots which must be assigned to channels embedded in the higher speed trunk. Thus, an additional or higher level of multiplexing is overlayed on the already multiplexed cells of the lower speed data streams. Each higher speed cell slot comprising a frame of the higher speed trunk is assigned to a particular cell slot of one of the lower speed trunks and it connotes this assignment implicitly by its position within the high speed frame. This higher level trunk assignment can be combined with the lower level channel assignment to permit a receiving end to either demultiplex the cells back to three lower speed trunks and then to further demultiplex the channel assignments for each lower speed trunk, or they can be demultiplexed through the two levels at once and simply delivered to their appropriate destinations.

Assuming for example that three lower speed trunks are to be multiplexed into a single higher speed trunk having a frame defined to have twenty-two cell slots, a desired distribution of cell slots from the three trunks can be achieved through an appropriate selection of a transform as previously discussed in the context of channel assignment distribution. The table in FIG. 13a shows how trunks can be allocated cell slots of the high speed frame in a manner previously described for channels as illustrated in the table of FIG. 5b. The table in FIG. 13a shows three trunks as the sources or sinks. Trunk 1 produces 5 cells per high speed frame, Trunk 2 produces 9 and Trunk 3 produces 7. Each trunk is preferably assigned a contiguous range of the set of element addresses. One cell slot (identified as element address E21 in the table) is dedicated to high speed frame synchronization as discussed previously. Trunk 1 is assigned element addresses {E0, E1, E2, E3, E4} which transforms using the mirror image transform to the set of cell slot addresses {T0, T4, T8, T16, T24}, and which ultimately maps to position numbers {1, 4, 7, 12, 18}. Element addresses for Trunks 2 and 3 are similarly assigned and transformed to cell slot addresses and then to position numbers. The frame cell is assigned to element address E21 that transforms to cell slot address T21 and, in turn, maps to Position Number 16.

Figures 13B, 13C, 13D:
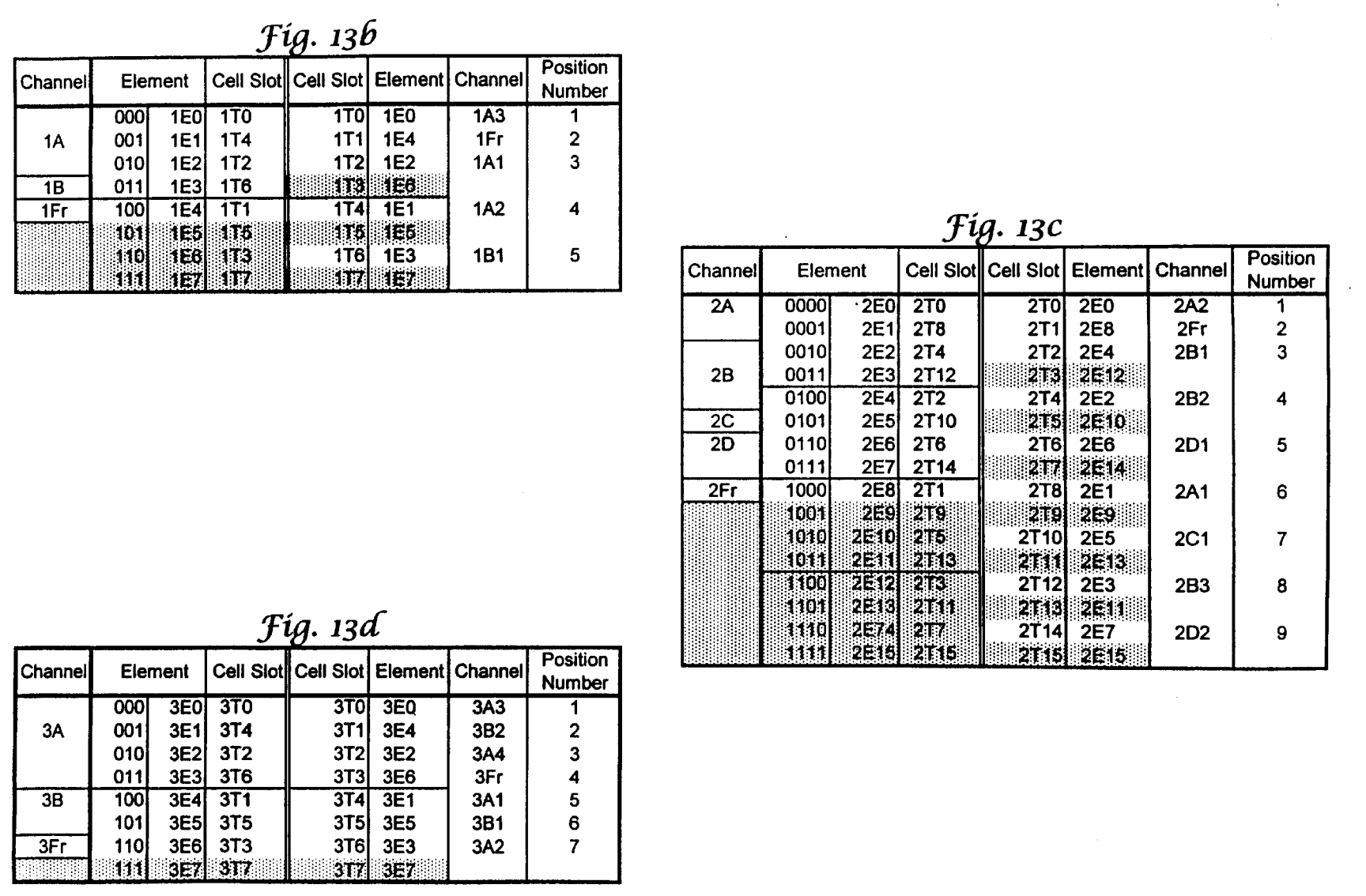

FIGS. 13b, 13c and 13d show possible channel assignments for the three multiplexed low speed trunks respectively. It is assumed that each of the three trunks have channel to cell slot assignments that were achieved through application of the method of the present invention as described in the tables. The table in FIG. 13b shows 2 channels A and B for Trunk 1. In addition, it indicates a framing channel Fr. FIG. 13c shows 4 channels, A, B, C, and D plus a framing channel Fr for Trunk 2. FIG. 13d shows 2 channels A and B plus a framing channel Fr for Trunk 3.

The position in the high speed trunk of the Fr channel for each of the lower speed trunks depends on the propagation delay of the trunk between the two ends of the trunk communication facility and on the relative phase of the framing clocks at the two ends. Thus, it is necessary to account for each Fr cell being located at any of the possible position numbers within the frame of the high speed trunk.

FIG. 14 is a table that illustrates the consolidation of assignment information that is provided in FIGS. 13a–13d for the two levels of multiplexing, for each of the position numbers of the high speed frame. The first column of the table labeled Position Number corresponds to the 22-cell positions comprising the frame of the high speed trunk as shown in FIG. 13a. The second column labeled Trunk shows the low speed trunk assigned to each high speed trunk position number. The third column labeled Channel denotes the particular cell slot assigned to each of the 22 position numbers. For example, in the first row of the table, Channel 1A1 denotes Channel A of trunk 1 and that the cell slot has a sequence number 1 because it is the first cell slot position (in time) for Channel A after the occurrence of the frame cell 1Fr. The element address which was used to logically assign the high speed cell slot to trunk 1 is E0 as shown in the fourth column. The Channel Position column refers to the position number of the relevant low speed trunk table. For the first row of the table in FIG. 14, the Channel Position of the cell referred to by 1A1 is 1P3. (It is shown in the table of FIG. 13b as Position Number 3, the first cell slot position of Trunk 1 after its framing pulse.) The corresponding element address within the low speed trunk is 1E2.

The position of the frame cells for Trunk 1 has been assumed to be Position Number 18 of the high speed trunk. Likewise, the frame cell positions for Trunks 2 and 3 have been assumed to be Position Numbers 14 and 22 respectively. It is important that the sequence of cell slot positions be maintained for each channel of each low speed trunk with respect to its frame position so that the data being transmitted over the high speed trunk occurs in the order it was being transmitted over the low speed trunk. Otherwise, the data might be received out of order.

Figure 15:
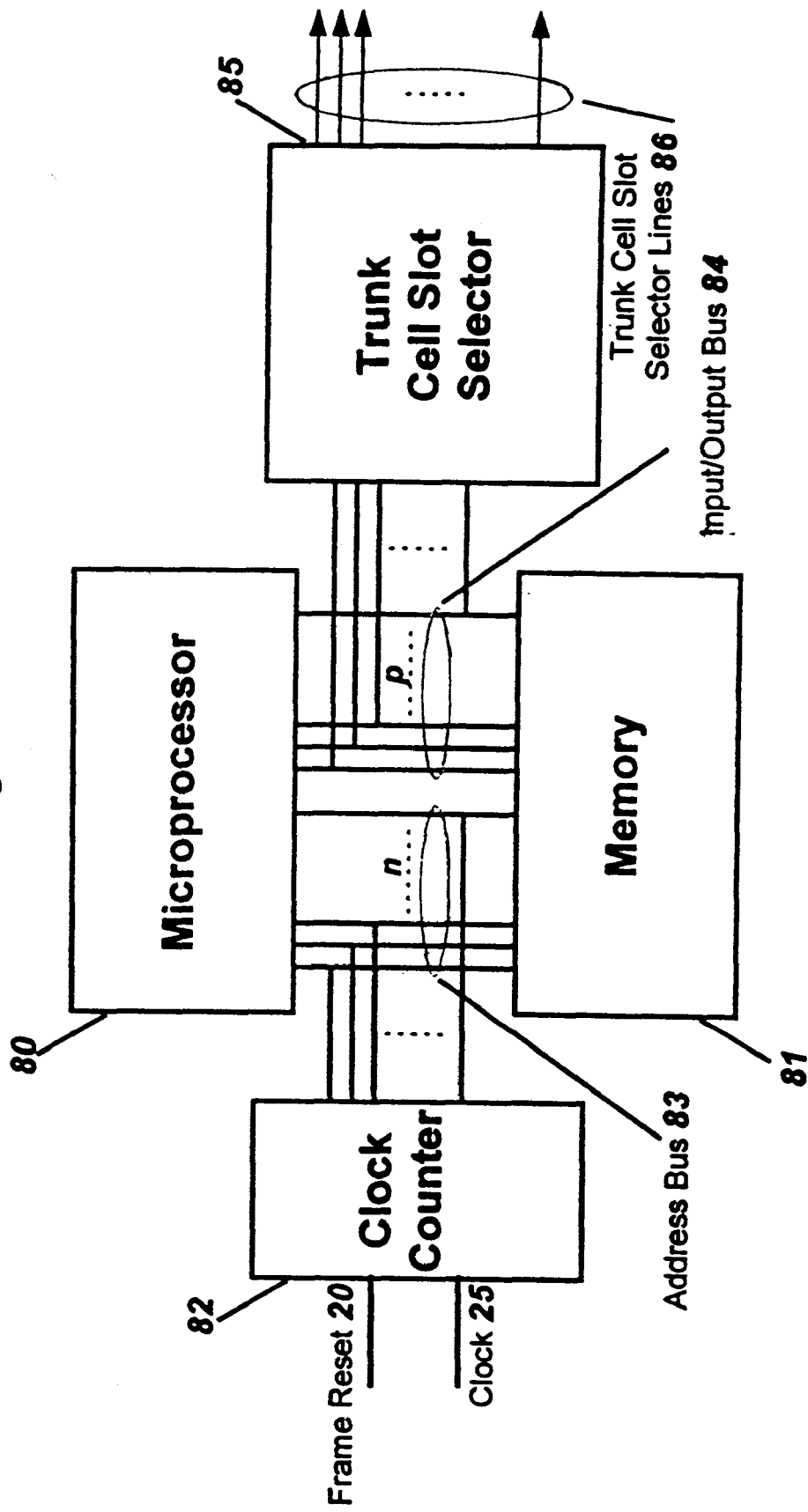
FIG. 15 is a diagram of a microprocessor embodiment of the invention capable of handling a mix of time and space divided cell sources or sinks.

FIG. 15 shows a block diagram of an apparatus for implementing the above-described alternate embodiment. In physical appearance it is similar to the embodiment shown in FIG. 10. A Microprocessor 80 is connected to Memory 81 where the purpose of the combination is to store trunk addresses for each position number of the high speed trunk. The process is synchronized with Frame Reset Signal 20 to assure that the Fr cell occurs at the proper position (position 16 in the illustration) in the high speed trunk. Clock Counter 82 retrieves the trunk address corresponding to each position number so that for each clock cycle increment the clock state appearing on Address Bus 83 causes the appropriate trunk address to appear on Input/Output Bus 84. The Trunk Cell Slot Selector 85 causes selector signals to appear at appropriate times on Trunk Cell Slot Selector Lines 86.

Operationally, in the embodiment described, only the first two or three columns of FIG. 14 are relevant to the operation of the Clock Counter 82. The remaining columns are used by Microprocessor 80 to construct in memory the first two columns of the table. They are included in the figure for clarity of description of the invention in using transform table methods.

The appearance of each of the frame cells from the low speed trunks are determined by propagation delay and other factors in practical systems. Thus, as shown in the third column of FIG. 14, the frame cell for Trunk 1 occurs at Postion Number 18, and for Trunks 2 and 3 at positions 14 and 22 respectively. The table of FIG. 14 is constructed based on the channel allocation tables of FIG. 13. By communicating the knowledge of the low speed trunk channel allocations to a microprocessor, the microprocessor can be programmed to produce the first three columns of the table in memory. By using a counter to denote the first column, Postion Number, the succession of trunk numbers shown in the second column can be used to to drive the Trunk Cell Slot Selector 85.

For each of the low speed trunks, the methods of the invention described in the other embodiments previously may be used to select individual channels.

At a distant end, a counter can again be used to denote the first column, Postion Number. The succession of trunk numbers shown in the second column can be used to to drive a Trunk Cell Slot Selector 85 from which three low speed trunks are again derived. Alternatively, the third column could be used to drive a Cell Slot Selector 75 as shown in FIG. 10.

One potential difficulty with the method illustrated in the table of FIG. 14 is that element addresses of the high speed trunk that correspond to each individual low speed channel from the low speed trunks are often not in contiguous element address order. Thus, it is not possible to treat these low speed channels as if they were a single channel of a high speed trunk as described in the previous embodiments. This fact could make a switching embodiment of the invention more complex than would otherwise be the case.

There is a meaningful extension to this embodiment that allows for selection of individual low speed channels without resorting to the tandem arrangement implied by the above description of the embodiment of FIG. 15 and causes channel assignments at a distant end of a high speed trunk to work with low speed trunk channels as if they were individual channels of the single high speed trunk Based on the example of FIG. 13, the essence of this extension is illustrated in FIG. 16 for one specific low speed trunk.

Channels embedded in the low speed trunks are allocated consecutive low speed trunk element addresses as shown in FIGS. 13b, c and d. Trunks embedded in the high speed trunk are allocated consecutive high speed trunk element addresses as shown in FIG. 13a FIG. 16 shows the details of the extension of the embodiment for Trunk 2.

FIG. 16a shows a desirable allocation of channels to high speed trunk element addresses that would allow the time division embodiments to function as contiguous element address channels. FIG. 16b shows the high speed trunk element addresses as they occur in the example shown in FIG. 13a. Although the element addresses for Trunk 2 are assigned contiguously to 9 element addresses as shown in FIG. 13c, the time order of these addresses is not the same as the cell slot order for all contiguous ranges of 9 high speed trunk element addresses. By introducing a set of buffers in each of the low speed channels connected to the Trunk Cell Slot Selector Lines 86, appropriate delays can be inserted to cause the desired ordering to occur.

FIG. 16c shows the workings of a delay mechanism suitable for the purpose. The order of assignment of channel cells for Trunk 2 (using the specific assignment technique described in the preferred embodiment) is {Fr B B D A C B D A} as shown in FIG. 13c and in column 2 of FIG. 16c. Column 1 of FIG. 16c shows the position number of Trunk 2 as used in FIG. 13c. Column 2 shows the corresponding channel cell reference. Again, for example, 2B2 refers to Trunk 2, Channel B and the second occurrence of a Channel B cell after the occurrence of the frame cell 2Fr.) The third column of FIG. 16c shows the desired order of the cells embedded in the high speed trunk that would enable direct multiplexing of the individual low speed channels on the basis that of each channel being represented by consecutive element addresses. Here the order of the channels is {Fr D B B D C A B A}. The table shows the case (as in FIG. 14) where the cell 2Fr is aligned before reordering to Position Number 14 of the high speed trunk. Column four shows the H(igh) S(peed) Trunk Position number for this specific low speed trunk frame offset. The number of low speed trunk positions that each of the low speed multiplexed channels must be delayed to reorder Trunk 2 Channels (as shown in column 2) to H(igh) S(peed) Trunk Channels (as shown in column 3) are shown in the columns labeled Trunk 2 Delay (1) and Trunk 2 Delay (2) for the two relevant to be described—one where the low speed trunk is a source, the other where it is a sink. Trunk 2 Delay (i) shows the case where the low speed trunk is a source. For example, in the first row, channel 2C1, occurring at Trunk 2 position 7 must be delayed to position 9, a delay of 2 low speed trunk positions. (This fact is indicated in Trunk 2 Delay (1) column by 2(7:9).) In the next row, channel 2B3 must be delayed from position 8 to position 2, a delay of 3 positions; it is indicated by 3(8:2). The last column of the table labeled Trunk 2 Delay (2) shows the case where the low speed Trunk 2 is a sink rather than a source. In this case, the delays refer to the number of low speed trunk positions that a cell accepted from the high speed trunk must be delayed before being demultiplexed using the assignments of FIG. 13c. Thus, for channel 2C1, cells appearing at position 9 must be delayed 7 positions to appear at position 7 before being demultiplexed as a channel within the low speed trunk. (The column Trunk 2 Delay (2) shows this as 7 (9:7).) Similarly, channel 2B3 must be delayed from position 2 to position 8, a delay of 6 positions and is denoted as 6 (2:8).

Note that the sum of the delays for each row shown in Trunk 2 Delay (1) and Trunk 2 Delay (2) are always 9, the length of the frame for Trunk 2. The maximum possible delay is the length of the frame (as is the case for position 5 with channel 2D1 where the Trunk 2 is a source). Thus, within the embodiment shown in FIG. 15, a delay mechanism known in the art as time slot interchanger is included within the Trunk Cell Slot Selector 85 shown in the figure. This variation of this alternate embodiment can thus increase the system delay by as much as one frame period. [Note: In the case where a delay is required for an individual channel equal to the entire frame period (as illustrated for channel 2D1) the decision as to whether this maximum delay is associated with the low speed trunk acting as a source or a sink is easy to determine. For a given frame, the order of 2D1 and 2D2 must be maintained within the frame. From FIG. 16c, it can be seen (from the second column) that cell 2D2 occurs 7 positions after the frame cell 2Fr and further, that is must be delayed by 8 positions to satisfy the cell slot interchange conditions. Thus, within a given frame, for cell 1D2 to follow cell cell 1D1 must be delayed 9 positions. Otherwise, the order of the D channel cells would not be maintained.]

Fifth Preferred Embodiment

Multicasting and conferencing are other applications of the invention. An embodiment that supports these capabilities is an extension of other embodiments heretofore described.

Figure 17A:
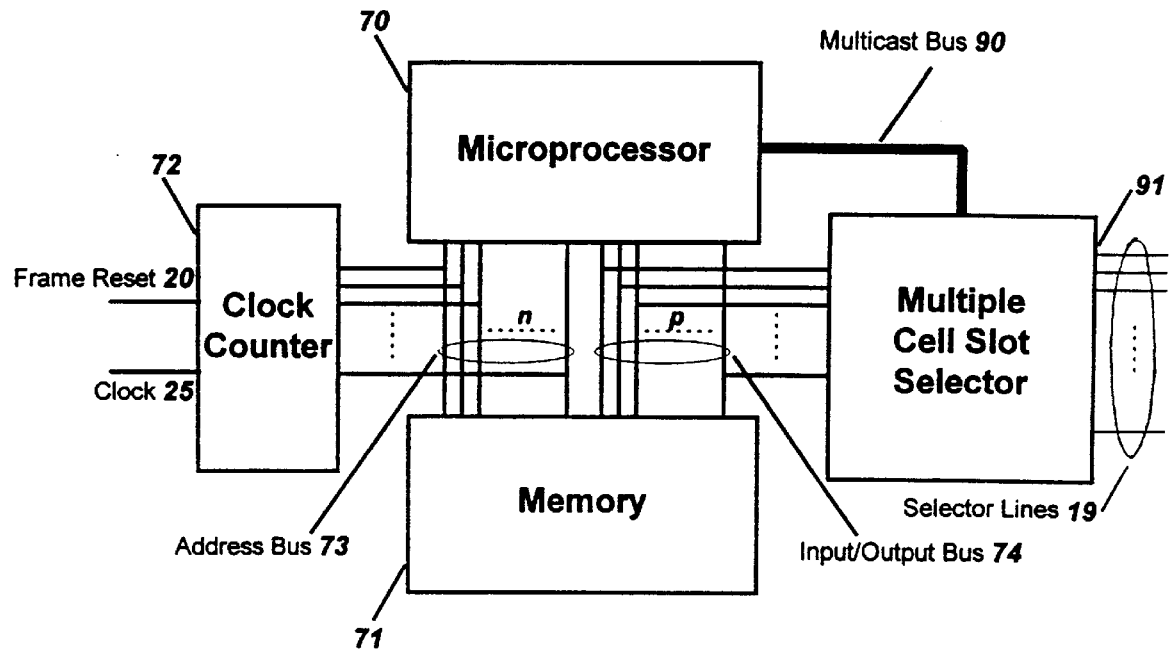
FIG. 17a depicts a multicasting embodiment of the invention.

A telecommunication multicast is defined as the sending of a signal from one source to more than one sink. In terms of the invention, multicasting is the process of connecting one source to many sinks. FIG. 17a shows a block diagram of an extension of Alternate Embodiment Two that performs this function. Added to the embodiment illustrated in FIG. 10 is a Multicast Bus 90. The width of this bus is the same as the Input/Output Bus 74 that has been drawn in more detail in the figure. In some embodiments, the functions described for Multicast Bus 90 are performed using Input/Output Bus 74 with appropriate control circuitry. The role of Cell Slot Selector 75 of FIG. 10 has been expanded to become a Multiple Cell Slot Selector 91. It contains a set of storage registers, one for each of the Selector Lines 19 similar to Alternate Embodiment Two. However, the present alternate embodiment allows Microprocessor 70 to load more than one of the storage registers with the same channel value that appears on Input/Output Bus 74 causing the relevant Selector Lines 19 to place the chosen cell value into all of their corresponding sinks.

A telecommunication conference expands on the idea of a multicast. In general, it includes aggregating signals from more than one source and multicasting the resulting signal to more than one sink. The mechanism shown in FIG. 17b can be used to select signals to be aggregated. Its function in this case is to connect many sources to a single sink through an aggregator. In the usual case, the sink is a channel in a multiplexed set of cells that is then multicast to appropriate sinks.

Figure 17B:
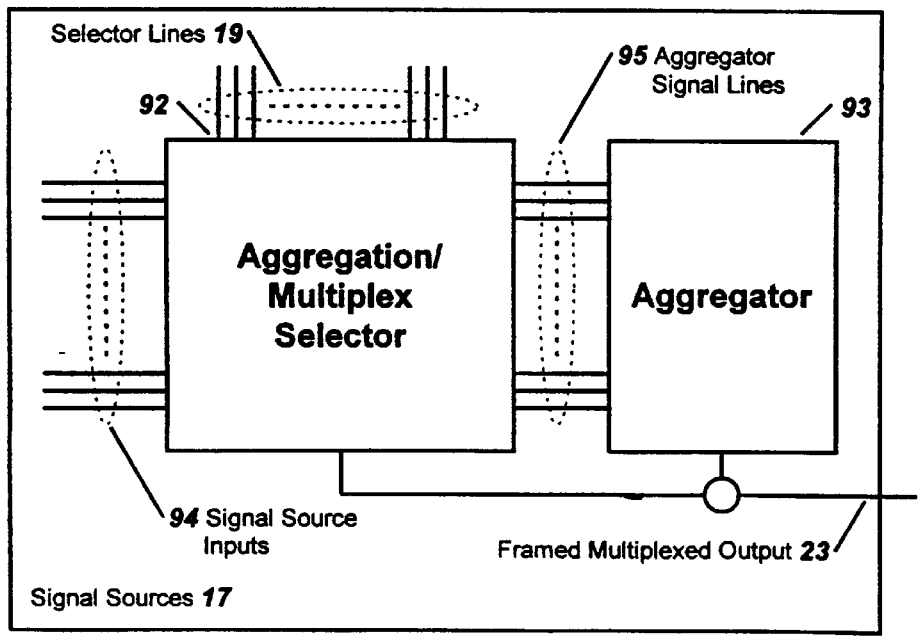
FIG. 17b depicts a conferencing embodiment of the invention.

Referring to FIG. 3a and FIG. 17b, the function of Signal Sources 17 is expanded to include an Aggregation/Multiplex Selector 92 and an Aggregator 93. Signal Source Inputs 94 are the cell content inputs contained in Signal Sources 17. FIG. 17a shows Signal Sources 17 modified to accomplish the needed conferencing functions. Selector Lines 19 and Signal Source Inputs 94 are fed to Aggregation/Multiplex Selector 92. The output of the Aggregation/Multiplex Selector 92 is connected through Aggregator Signal Lines 95 to the Aggregator 93. When a set of signals are to be conferenced, selection pulses on a multiplicity of the Selector Lines 19 causes a multiplicity of Signal Source Inputs 94 to be fed through Aggregator Signal Lines 95 to the Aggregator 93. When a single signal source is to be multiplexed into the Framed Multiplex Output Signal 23, only one of the Selector Lines 19 contains a pulse. In this instance, the output of Aggregation/Multiplex Selector 92 is fed directly to the Framed Multiplex Output Signal 23 connected to an OR gate with the output from Aggregator 93. No signal is sent to Aggregator 93.

The aggregator may be implemented as simply as a large OR gate that combines all of the digital signals selected to appear on the Aggregator Signal Lines 95. In other embodiments, the functionality of the Aggregator 93 may be more complex. For example, if the cell contents are analog signal samples, a summing junction operation may occur. In this case, specialized capabilities such as "talker gate" functionality found in voice conference bridges may be included. The functionality of Aggregator 93 may extend to the contents of more than the cells that occur at a specific time. In this case, appropriate timing signals are fed to Aggregator 93 to assure that the functionality is enabled and that the output of Aggregator 93 is fed to the Framed Multiplex Output Signal 23 at the proper time. In a Time Division Switch application, the Aggregator 93 can be fed signals from a plurality of high-speed trunks and local sources.

What is claimed is:

1. A method for allocating cell slots comprising a frame to one or more channels of a transmission medium, the number of cell slots F comprising the frame being equal to any integer number, said method comprising the steps of:

arbitrarily assigning disjoint subsets of a contiguous range of F element addresses to each of the one or more channels, each of the subsets comprising a number of the F element addresses equal to the number of the cell slots to be allocated to the channel to which the subset is assigned; and transforming each of the range of F contiguous element addresses into one of F unique cell slot addresses on a one-to-one basis, wherein each of the F cell slot addresses connotes a relative cell slot position for one of the F cell slots within the frame, and whereby the cell slot addresses derived from said transformation of the element addresses of each assigned subset connote the relative position of cell slots allocated to the channel to which each subset is assigned.

2. The method of claim 1 wherein the element addresses comprising the assigned disjoint subsets are also contiguous.

3. The method of claim 1 wherein the range of F contiguous element addresses is numbered between zero and F-1, and wherein said step of transforming further comprises the step of reversing the bit order of binary representations of each of the element addresses to obtain each of the cell slot addresses.

4. The method of claim 2 wherein the range of F contiguous element addresses is numbered between zero and F-1, and wherein said step of transforming further comprises the step of reversing the bit order of binary representations of each of the element addresses to obtain each of the cell slot addresses.

5. The method of claim 1 wherein F is a number that is a power of 2.

6. A method for transmitting cells of data over one or more channels of a communications medium, each of said one or more channels for carrying cells generated by a source to which it is assigned, the cells being transmitted in a sequence of frames, said method comprising the steps of:

allocating one or more cell slots comprising the frames to each of the one or more channels, wherein the number of cell slots F comprising the frames is equal to any integer and each of the cell slots is capable of carrying one of the cells, said step of allocating further comprising the steps of:

arbitrarily assigning disjoint subsets of a contiguous range of F element addresses to each of the one or more channels; each of the subsets comprising a number of the F element addresses equal to the number of the cell slots to be allocated to the channel to which the subset is assigned;

transforming each of the range of F contiguous element addresses into one of F unique cell slot addresses on a one-to-one basis, wherein each of the F cell slot addresses connotes a relative cell slot position for one of the F cell slots within the frames, and whereby the cell slot addresses derived from said transformation of the element addresses of each assigned subset connote the relative position of cell slots within the frames as allocated to the channel to which each subset is assigned; and for each of the sequence of frames:

sequentially generating each of the cell slot addresses in the order of their relative position in the frame to select the source to which the cell slot is allocated; and inserting into each cell slot a next cell of data generated by the selected source in response to the generated cell slot address.

7. The method of claim 6 wherein the element addresses comprising the assigned disjoint subsets are also contiguous.

8. The method of claim 6 wherein the range of F contiguous element addresses is numbered between zero and F-1, and wherein said step of transforming further comprises the step of reversing the bit order of binary representations of each of the element addresses to obtain each of the cell slot addresses.

9. The method of claim 7 wherein the range of F contiguous element addresses is numbered between zero and F-1, and wherein said step of transforming further comprises the step of reversing the bit order of binary representations of each of the element addresses to obtain each of the cell slot addresses.

* * * * *